(12) United States Patent
Balk et al.

(10) Patent No.: US 10,913,811 B2
(45) Date of Patent: Feb. 9, 2021

(54) FINELY DIVIDED AQUEOUS MULTISTAGE POLYMER DISPERSION, METHOD FOR THE PRODUCTION THEREOF, AND USE THEREOF AS A BINDER

(71) Applicant: BASF SE, Ludwigshafen am Rhein (DE)

(72) Inventors: Roelof Balk, Boehl-Iggelheim (DE); Bastiaan Lohmeijer, Mannheim (DE); Robert Wrazidlo, Ellerstadt (DE)

(73) Assignee: BASF SE

( * ) Notice: Subject to any disclaimer, the term of this patent is extended or adjusted under 35 U.S.C. 154(b) by 0 days.

(21) Appl. No.: 16/085,807

(22) PCT Filed: Mar. 14, 2017

(86) PCT No.: PCT/EP2017/055985
§ 371 (c)(1),
(2) Date: Sep. 17, 2018

(87) PCT Pub. No.: WO2017/157934
PCT Pub. Date: Sep. 21, 2017

(65) Prior Publication Data
US 2019/0100613 A1    Apr. 4, 2019

(30) Foreign Application Priority Data

Mar. 18, 2016  (EP) ..................................... 16161067

(51) Int. Cl.
*C08F 265/06* (2006.01)
*C09D 151/00* (2006.01)
(Continued)

(52) U.S. Cl.
CPC .............. *C08F 265/06* (2013.01); *C08F 2/22* (2013.01); *C08F 2/38* (2013.01); *C08K 5/07* (2013.01); *C09D 5/027* (2013.01); *C09D 7/65* (2018.01); *C09D 151/003* (2013.01); *C08F 212/08* (2013.01); *C08F 220/14* (2013.01);
(Continued)

(58) Field of Classification Search
CPC . C08F 2/22; C08F 2/38; C08F 265/06; C08K 5/03; C09D 5/027; C09D 7/65; C09D 151/003
See application file for complete search history.

(56) References Cited

U.S. PATENT DOCUMENTS 4,226,007 A  10/1980 Duenser
4,269,749 A  5/1981 Marriott et al.
(Continued)

FOREIGN PATENT DOCUMENTS

AT     402 504 B     6/1997
AU     39042/89 A    2/1990
(Continued)

OTHER PUBLICATIONS

International Search Report dated May 29, 2017, in PCT/EP2017/055985 filed Mar. 14, 2017.

*Primary Examiner* — Edward J Cain
(74) *Attorney, Agent, or Firm* — Faegre Drinker Biddle & Reath LLP

(57) ABSTRACT

The present invention provides very finely divided polymer dispersions obtainable by at least one two-stage emulsion polymerization, wherein
1) an acid-rich first polymer P1 is prepared by a radical polymerization from a $1^{st}$ composition comprising
   A) at least one monomer selected from the group of (cyclo)alkyl (meth)acrylates, vinylaromatics having up to 20 carbon atoms, a radically polymerizable compound selected from the group of ethylenically unsaturated nitriles having up to 20 carbon atoms, vinyl esters of carboxylic acids containing up to 20 carbon atoms, vinyl halides having up to 10 carbon atoms, and vinyl ethers of alcohols containing 1 to 10 carbon atoms
   B) at least one $\alpha,\beta$-ethylenically unsaturated carboxylic acid
   C) at least one crosslinking monomer with a keto or aldehyde group
   D) optionally at least one adhesion promoter
   E) optionally tert-butyl acrylate
   F) optionally further monomers M
   in the presence of a chain link transfer agent,
2) the polymer P1 prepared under 1) is admixed with a base,
3) a hydrophobic polymer P2 is prepared by radical polymerization, in the presence of the polymer P1 treated under 2), from a $2^{nd}$ composition comprising
   A) at least one monomer selected from the group of (cyclo)alkyl (meth)acrylates, vinylaromatics having up to 20 carbon atoms, a radically polymerizable compound selected from the group of ethylenically unsaturated nitriles having up to 20 carbon atoms, vinyl esters of carboxylic acids containing up to 20 carbon atoms, vinyl halides having up to 10 carbon atoms, and vinyl ethers of alcohols containing 1 to 10 carbon atoms
   B) optionally at least one $\alpha,\beta$-ethylenically unsaturated carboxylic acid
   C) at least one crosslinking monomer with a keto or aldehyde group
   D) optionally at least one adhesion promoter, and also
   E) optionally further monomers M,
4) and by optional addition, subsequent to the polymerization of P1 and P2, of a water-soluble at least trifunctional alkoxylated polyamine, more particularly an ethoxylated and/or propoxylated triamine.

16 Claims, 1 Drawing Sheet

(51) Int. Cl.
    *C09D 7/65*     (2018.01)
    *C08F 2/22*     (2006.01)
    *C08F 2/38*     (2006.01)
    *C08K 5/07*     (2006.01)
    *C09D 5/02*     (2006.01)
    *C08F 220/18*     (2006.01)
    *C08F 212/08*     (2006.01)
    *C08F 220/14*     (2006.01)
    *C08L 79/02*     (2006.01)

(52) U.S. Cl.
    CPC ...... *C08F 220/18* (2013.01); *C08F 220/1804* (2020.02); *C08L 79/02* (2013.01)

(56) References Cited

U.S. PATENT DOCUMENTS

| | | |
|---|---|---|
| 4,526,945 A | 7/1985 | Carlson et al. |
| 4,680,354 A | 7/1987 | Lin et al. |
| 4,733,005 A | 3/1988 | Schmidt et al. |
| 5,498,659 A | 3/1996 | Esser |
| 5,739,196 A | 4/1998 | Jenkins et al. |
| 5,939,482 A | 8/1999 | Kriessmann et al. |
| 5,962,571 A | 10/1999 | Overbeek et al. |
| 2005/0107527 A1 | 5/2005 | Holub et al. |
| 2014/0039122 A1 | 2/2014 | Mestach et al. |

FOREIGN PATENT DOCUMENTS

| | | |
|---|---|---|
| CN | 101679536 A | 3/2010 |
| CN | 103459432 A | 12/2013 |
| DE | 2 061 213 | 6/1971 |
| DE | 2 207 209 | 10/1972 |
| DE | 27 22 097 A1 | 11/1978 |
| DE | 38 25 637 A1 | 3/1990 |
| EP | 0 196 783 A1 | 10/1986 |
| EP | 0 199 436 A1 | 10/1986 |
| EP | 0 338 486 A2 | 10/1989 |
| EP | 0 710 680 A2 | 5/1996 |
| EP | 0 196 707 A1 | 5/1999 |
| EP | 0 710 680 B1 | 3/2003 |
| EP | 2 371 870 A1 | 10/2011 |
| EP | 3 194 454 | 7/2017 |
| JP | 2006-219559 A | 8/2006 |
| WO | WO 87/03605 | 6/1987 |
| WO | WO 93/16133 | 8/1993 |
| WO | WO 95/29963 A1 | 11/1995 |
| WO | WO 98/14511 | 4/1998 |
| WO | WO 99/25780 | 5/1999 |
| WO | 2004/056903 A1 | 7/2004 |
| WO | WO 2012/084973 A1 | 6/2012 |
| WO | WO 2012/084974 A1 | 6/2012 |
| WO | WO 2012/130712 A1 | 10/2012 |
| WO | WO 2012/140042 A1 | 10/2012 |
| WO | WO 2016/042116 A2 | 3/2016 |
| WO | WO 2016/042116 A3 | 3/2016 |

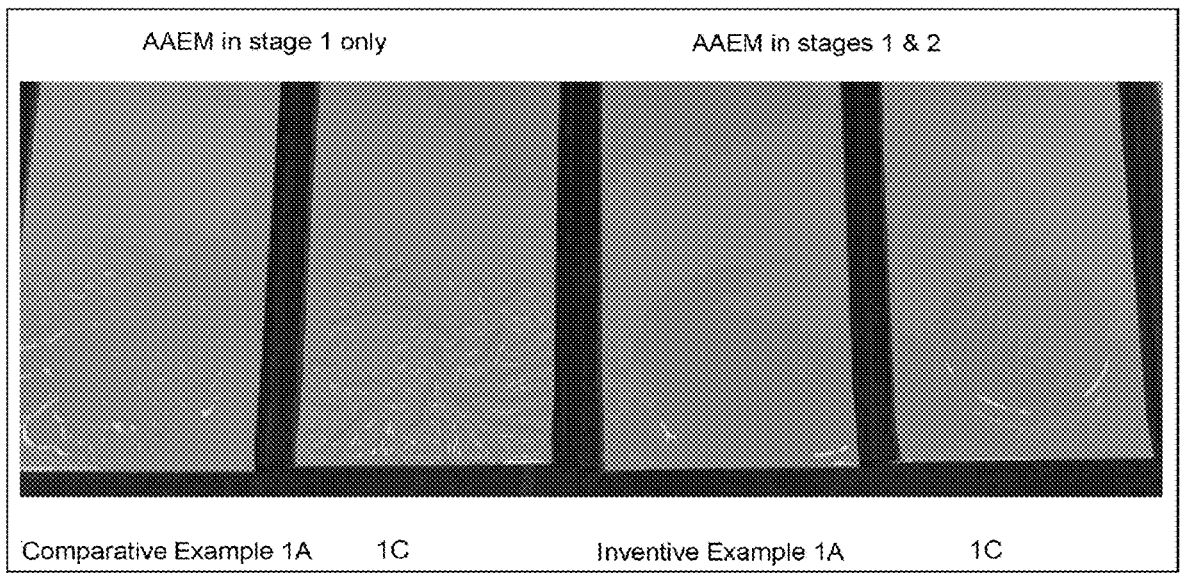
Water resistance of coatings after 2 days' drying at RT and 2 hours' contact with water.

FINELY DIVIDED AQUEOUS MULTISTAGE POLYMER DISPERSION, METHOD FOR THE PRODUCTION THEREOF, AND USE THEREOF AS A BINDER

The present invention provides multistage aqueous polymer dispersions which exhibit excellent filming at low temperatures, methods for producing them, and their use as binders for the coating of substrates.

Aqueous polymer dispersions are common knowledge. They are fluid systems comprising in disperse distribution, as a disperse phase in the aqueous dispersing medium, polymer coils that consist of a plurality of interentangled polymer chains, referred to as the polymer matrix or polymer particles. The mean diameter of the polymer particles is frequently in the range from 10 to 1000 nm, more particularly in the range from 30 to 300 nm. Aqueous polymer dispersions are used as binders in a multiplicity of technical applications.

Where they are used as binders for coatings on substrates, one of the most important requirements of such coatings is that they possess high hardness and hence exhibit good scratch and blocking resistance. For environmental reasons, the aim is for filming of the binder in the range from <0 to 40° C., so that little or none of a film-forming assistant is needed. Where the binders are employed in aqueous opaque coatings such as gloss or satin-finish paints for Do-It-Yourself (DIY) applications, no film-forming assistants should be used, since such assistants evaporate during drying and burden the environment.

An additional requirement of the aqueous binders for DIY applications is that they contain no components which necessitate labeling, or that the amounts of such components used in binders are so low as not to require labeling, since—above a certain level—such components cause allergic reactions on skin contact; examples are certain biocide components or additives.

For these applications, generally speaking, multistage binders are used that have a low minimum film-forming temperature and lead to high hardness after drying.

From EP-B 0 710 680 it is known that by multistage emulsion polymerization it is possible to produce polymer dispersions which have a low minimum film-forming temperature (MFFT) and form films having good blocking resistance. Film-forming assistants are used in the formulations for stains or satin-finish paints that are described in this specification.

WO 2012/130712 A1 describes multistage aqueous polymer dispersions which are film-forming at low temperatures but nevertheless produce films with high hardness and excellent blocking resistance, and which, moreover, score highly for wet adhesion and shelf life. Likewise described are methods for producing them and also their use as binders for the coating of substrates. Preparation takes place in the presence of emulsifiers; diacetoneacrylamide (DAAM) and adipic dihydrazide (ADDH) are used as a crosslinking system.

WO 95/29963 A1 describes a method for producing an aqueous, crosslinkable polymer composition which is free of organic solvents. The composition comprises an acid-functional oligomer A having a Tg of 10 to 125° C., crosslinkable functional groups, and a polymer B having a Tg of at least 25° C. below that of the polymer A. The polymer compositions are notable for a good balance between low MFFT and high hardness. Attaining the high performance of these binders in the applications described was possible only through the use of DAAM as crosslinking monomer and ADDH as crosslinking additive.

In WO 2012/084973 A1 an aqueous polymer coating composition is described that comprises at least one vinyl polymer A having a mass-average molar mass Mw in the range from 1000 to 150000 g/mol and an acid number >5 mg KOH/g and comprises a vinyl polymer B having a mass-average molar mass Mw of at least 80000 g/mol and an acid number <35 mg KOH/g. The examples used DAAM as crosslinking monomer and ADDH as crosslinking additive.

WO 2012/084974 A1 describes an aqueous polymer dispersion which comprises a vinyl polymer having at least two phases, comprising: A) 40 to 90 wt % of a vinyl polymer A having a glass transition temperature in the range from −50 to 30° C. and B) 10 to 60 wt % of a vinyl polymer B having a glass transition temperature in the range from 50 to 130° C., where the vinyl polymer A comprises 0.1 to 10 wt % of at least one acid-functional, olefinically unsaturated monomer, where at least 20 wt % of the vinyl polymer is used to form a vinyl polymer, and the vinyl polymer B derives from at least one biologically derived, regenerative, olefinically unsaturated monomer.

EP 0 338 486 A2 describes a method for producing stabilized latex, comprising the following steps: a) mixing of latex-forming monomers under emulsion polymerization conditions, to form in a first stage a hydrophilic, low molecular mass polymer reaction mixture which can be rendered water-soluble by pH adjustment; b) contacting the reaction mixture comprising the polymer of the first stage with latex-forming monomers under emulsion polymerization conditions, to form in a second stage a hydrophobic polymer which forms an inverse core-shell emulsion with the polymer from the first stage; and c) adjusting the pH of the emulsion in order to dissolve the first-stage polymer and the latex produced. The examples given do not use crosslinking monomers and crosslinking additives in the sense of the present specification.

In WO 93/16133 A2 and in U.S. Pat. No. 5,498,659A, storage-stable, crosslinkable, aqueous, polymeric formulations are described—and also methods for producing them—comprising at least one single-stage or multistage polymeric component which carries both acid and acetoacetoxy functionality, and a nonpolymeric polyfunctional amine. In the examples, this acetoacetoxy functionality is used in the single polymer stage or only in the first polymer stage; hexamethylenediamine is used as the amine.

The diamine used in these specifications has the effect, after drying, of producing crosslinking with the acetoacetoxy groups present; however, on account of its <250° C. boiling point, it contributes to the VOC content of the formulation (Volatile Organic Compound(s)).

EP 0916707 A1 describes aqueous coating compositions comprising an emulsion polymer, having an improved open time. The polymer may carry, among others, an acetoacetoxy functionality; the compositions, in addition to an alkylpolyglycoside, also include a polyethermono- or -diamine.

WO 2012/140042 A1 describes a method for producing aqueous vinyl polymer dispersions which have good film-forming properties, high stability, and clarity, and also polymer dispersions obtainable by the method, and coating compositions produced from the polymer dispersions. The polymer dispersions produced in that specification are optionally hydroplasticized, by addition of a base, only after the polymerization of the second step.

EP 2 371 870 A1 describes a multistage emulsion polymer comprising 10 to 30 wt %, based on the weight of the multistage emulsion polymer, of a shell, comprising a first polymer having an acid number of 5 to 100 mgr KOH/g polymer, where the first polymer has a calculated Mn of 1000 to 4500 Da and a calculated Tg of less than 100° C., and from 70 to 90 wt %, based on the weight of the multistage emulsion polymer, of a core, comprising a second polymer having an acid number of 0 up to half the acid number of the first polymer, where the second polymer has a calculated Mn of greater than 20000 Da. The examples that are given do not use crosslinking monomers in the sense of the present invention.

The mandatory use of a crosslinking monomer in both polymerization stages, and also subsequent addition of an at least trifunctional alkoxylated amine, is not disclosed in any of the specifications.

In some of the examples described in these specifications, DAAM is used as crosslinking monomer and ADDH as crosslinking additive. If ADDH is left out, it is found that crack-free filming, especially in pigmented formulations, is not necessarily obtained. Furthermore, the desired hardness is not attained, and other properties, such as water resistance, wet adhesion and chemical strength, are no longer at the desired level. There are suitable measures, such as adapting the glass transition temperatures, that can be used to improve film formation, but in general the desired high hardness of the films is lost very rapidly.

As well as good film formation and high hardness, the coating systems are of course required to exhibit a range of other qualities. One very important requirement for DIY applications is high water resistance of the coating even shortly after it has dried: it must not swell when exposed to water, and must not show any surface damage after redrying. Without further measures, the emulsion polymers described above would exhibit inadequate early water resistance.

The object of the present intention was to produce emulsion polymers which, when used in aqueous coating compositions, allow the formation of crack-free films at low temperatures and without use of film-forming assistants, these films exhibiting high hardness and blocking resistance and also excellent early water resistance.

The object is achieved by means of a very finely divided polymer dispersion obtainable by at least one two-stage emulsion polymerization, wherein
1) an acid-rich first polymer P1 is prepared by a radical polymerization from a $1^{st}$ composition comprising
A) at least one monomer selected from the group of (cyclo)alkyl (meth)acrylates, vinylaromatics having up to 20 carbon atoms, a radically polymerizable compound selected from the group of ethylenically unsaturated nitriles having up to 20 carbon atoms, vinyl esters of carboxylic acids containing up to 20 carbon atoms, vinyl halides having up to 10 carbon atoms, and vinyl ethers of alcohols containing 1 to 10 carbon atoms
B) at least one α,β-ethylenically unsaturated carboxylic acid
C) at least one crosslinking monomer with a keto or aldehyde group
D) optionally at least one adhesion promoter
E) optionally tert-butyl acrylate
F) optionally further monomers M
in the presence of a chain transfer agent,
2) the polymer P1 prepared under 1) is admixed with a base,
3) a hydrophobic polymer P2 is prepared by radical polymerization, in the presence of the polymer P1 treated under 2), from a $2^{nd}$ composition comprising
A) at least one monomer selected from the group of (cyclo)alkyl (meth)acrylates, vinylaromatics having up to 20 carbon atoms, a radically polymerizable compound selected from the group of ethylenically unsaturated nitriles having up to 20 carbon atoms, vinyl esters of carboxylic acids containing up to 20 carbon atoms, vinyl halides having up to 10 carbon atoms, and vinyl ethers of alcohols containing 1 to 10 carbon atoms
B) optionally at least one α,β-ethylenically unsaturated carboxylic acid
C) at least one crosslinking monomer with a keto or aldehyde group
D) optionally at least one adhesion promoter, and also
E) optionally further monomers M,
4) and by optional addition, subsequent to the polymerization of P1 and P2, of a water-soluble at least trifunctional alkoxylated polyamine, more particularly an ethoxylated and/or propoxylated triamine.

The object is likewise achieved by a method for producing the polymer dispersion of the invention, wherein
at least one two-stage emulsion polymerization is carried out, comprising the steps of:
1) preparing an acid-rich first polymer P1 from the above-stated $1^{st}$ composition
2) admixing the polymer P1 prepared under 1) with a base
3) preparing a hydrophobic polymer P2 from the above-stated $2^{nd}$ composition in the presence of the polymer P1 treated under 2)
4) and optionally, subsequent to the polymerization of P1 and P2, adding a water-soluble at least trifunctional alkoxylated polyamine, more particularly an ethoxylated and/or propoxylated triamine.

The object is achieved, moreover, by a coating material in the form of an aqueous composition, comprising
i) at least one polymer dispersion of the invention,
ii) optionally at least one (in)organic filler and/or an (in)organic pigment,
iii) optionally an additive,
iv) water.

The object is likewise achieved by the use of the polymer dispersion of the invention for coating compositions or paints.

Implementing radically initiated emulsion polymerizations of monomers, especially unsaturated monomers, in an aqueous medium has been a topic of prior description on many occasions and is therefore adequately known to the skilled person [in this regard, see Emulsion polymerization in Encyclopedia of Polymer Science and Engineering, vol. 8, pages 659 ff. (1987); D. C. Blackley, in High Polymer Latices, vol. 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerisation, Interscience Publishers, New York (1965); DE-A 40 03 422; and Dispersionen synthetischer Hochpolymerer [Dispersions of synthetic high polymers], F. Hölscher, Springer-Verlag, Berlin (1969)]. The normal procedure for the radically initiated aqueous emulsion polymerization reactions is that the (ethylenically unsaturated) monomers are dispersed in the form of monomer droplets in the aqueous medium, with accompanying use of dispersants, and are polymerized by means of a radical polymerization initiator.

"Two-stage" emulsion polymerization in the sense of the present invention may be understood as an emulsion polymerization in which a radical emulsion polymerization takes place in a first stage, and the monomers present in the $1^{st}$ composition undergo complete polymerization to form a polymer. This is followed optionally by neutralization with a base. After that the polymerization of at least one stage further takes place, in which new monomers are polymerized by means of a radical emulsion polymerization, in the presence of the polymer from the first stage, to form a polymer. In the sense of the present invention, "1)" corresponds to the first stage and "3)" to the second stage in the emulsion polymerization.

The monomers of the second stage may be added in the manner of a gradient regime. The gradient regime in the sense of the present invention refers to an emulsion polymerization in which one or more monomers are metered in at a nonconstant rate. For reasons of ease of apparatus operability, in the experiments described here, the rates were varied not continuously (="true gradient") but instead stepwise (=interpolated gradient) (in the mathematical sense, accordingly, the plot of the metering rate against time represents a nonconstant function). In principle, however, continuous rate changes can be implemented even without great extra cost and complexity.

A "polymer" in the sense of the present invention may refer to a mixture of polymers which comes about in a formation reaction from monomers to give macromolecules.

The term (in)organic encompasses inorganic and/or organic.

The polymer dispersion may be prepared in the presence of at least one interface-active compound. A comprehensive description of suitable protective colloids is found in Houben-Weyl, Methoden der organischen Chemie [methods of organic chemistry], Volume XIV/1, Makromolekulare Stoffe [Macromolecular compounds], Georg Thieme Verlag, Stuttgart, 1961, pp. 411 to 420. Suitable emulsifiers are also found in Houben-Weyl, Methoden der organischen Chemie [methods of organic chemistry], Volume 14/1, Makromolekulare Stoffe [Macromolecular compounds], Georg Thieme Verlag, Stuttgart, 1961, pages 192 to 208.

Suitable emulsifiers include anionic, cationic, and nonionic emulsifiers. As interface-active substances, preference is given to using emulsifiers, whose relative molecular weights are typically below those of protective colloids. In particular it has proven appropriate to use exclusively anionic emulsifiers, or a combination of at least one anionic emulsifier and at least one nonionic emulsifier.

Useful nonionic emulsifiers are araliphatic or aliphatic nonionic emulsifiers, examples being ethoxylated mono-, di- and trialkylphenols (EO degree: 3 to 50, alkyl radical: $C_4$-$C_{10}$), ethoxylates of long-chain alcohols (EO degree: 3 to 100, alkyl radical: $C_8$-$C_{36}$), and also polyethylene oxide/polypropylene oxide homopolymers and copolymers. These polymers may comprise the alkylene oxide units polymerized in statistical distribution or in the form of blocks. Highly suitable are EO/PO block copolymers, for example. Preference is given to ethoxylates of long-chain alkanols (alkyl radical $C_1$-$C_{30}$, mean degree of ethoxylation 5 to 100) and, of these, particular preference to those having a linear $C_{12}$-$C_{20}$-alkyl radical and a mean degree of ethoxylation of 10 to 50, and also ethoxylated monoalkyl phenols.

Examples of suitable anionic emulsifiers are alkali metal and ammonium salts of alkyl sulfates (alkyl radical: $C_8$-$C_{22}$), of sulfuric monoesters with ethoxylated alkanols (EO degree: 2 to 50, alkyl radical: $C_{12}$-$C_{18}$) and with ethoxylated alkylphenols (EO degree: 3 to 50, alkyl radical: $C_4$-$C_9$), of alkylsulfonic acids (alkyl radical: $C_{12}$-$C_{18}$) and of alkylarylsulfonic acids (alkyl radical: $C_9$-$C_{18}$) or alkylbenzylsulfonic acids, alkaline earth metal alkylbenzenesulfonates, sulfonated fatty acids, sulfonated olefins, sulfonated diphenyl ethers, sulfosuccinates, fatty alcohol sulfates, alkylphenol sulfates, alkyl polyglycol ether sulfates, fatty alcohol ether sulfates, fatty alcohol phosphates, alkylphenol phosphates, alkyl polyglycol ether phosphates, alkylpolyalkylene oxide phosphates, and fatty alcohol ether phosphates. Further suitable emulsifiers are found in Houben-Weyl, Methoden der organischen Chemie, Band XIV/1, Makromolekulare Stoffe, Georg-Thieme-Verlag, Stuttgart, 1961, pp. 192-208.

Likewise suitable as anionic emulsifiers are bis(phenylsulfonic acid) ethers and their alkali metal or ammonium salts which carry a $C_4$-$C_{24}$ alkyl group on one or both aromatic rings. These compounds are common knowledge, from U.S. Pat. No. 4,269,749, for example, and are available commercially, in the form of Dowfax® 2A1 (Dow Chemical Company), for example.

Suitable cationic emulsifiers are preferably quaternary ammonium halides, e.g., trimethylcetylammonium chloride, methyltrioctylammonium chloride, benzyltriethylammonium chloride, or quaternary compounds of N—$C_6$-$C_{20}$-alkylpyridines, -morpholines or -imidazoles, e.g., N-laurylpyridinium chloride.

As emulsifiers, moreover, it is also possible to use those which in the course of the radical polymerization are incorporated into the polymer. These are generally compounds which carry at least one radically polymerizable group, preferably selected from the group consisting of allyl, acrylate, methacrylate, and vinyl ether, and at least one emulsifying group, preferably selected from the group indicated above.

Examples of these are incorporable emulsifiers of the brands Bisomer®, such as Bisomer® MPEG 350 MA from Geo Specialty Chemicals, USA, Hitenol® BC-20 (APEO), Hitenol® BC-2020, Hitenol® KH-10 or Noigen® RN-50 (APEO) from Dai-Ichi Kogyo Seiyaku Co., Ltd., Maxemul® 6106, Maxemul® 6112, Maxemul® 5010, Maxemul® 5011 from Croda, Sipomer® PAM 100, Sipomer® PAM 200, Sipomer® PAM 300, Sipomer® PAM 4000, Sipomer® PAM 5000 from Rhodia, Adeka® Reasoap® PP-70, Adeka® Reasoap® NE-10, Adeka® Reasoap® NE-20, Adeka® Reasoap® NE-30, Adeka® Reasoap® NE-40, Adeka® Reasoap® SE-10N, Adeka® Reasoap® SE-1025A, Adeka® Reasoap® SR-10, Adeka® Reasoap® SR-1025, Adeka® Reasoap® SR-20, Adeka® Reasoap® ER-10, Adeka® Reasoap® ER-20, Adeka® Reasoap® ER-30, Adeka® Reasoap® ER-40 from Adeka, Pluriol® A 010 R, Pluriol® A 12 R, Pluriol® A 23 R, Pluriol® A 46 R, Pluriol® A 750 R, Pluriol® A 950 R, Pluriol® A 590 I, Pluriol® A 1190 I, Pluriol® A 590 V, Pluriol® A 1190 V, Pluriol® A 5890 V, Pluriol® A 308 R and DAA ES 8761 from BASF, Latemul® S 180 A and Latemul® S 180 from Kao, Eleminol® JS-2 from Sanyou Kasei, Aquaron® HS-1025 from Daiichi Kogyou Seiyaku, and C12-AMPS from Lubrizol.

It is likewise possible, moreover, to use copolymerizable emulsifiers, as described in EP 14185506.4.

In accordance with the invention, however, both the polymerization of the first stage and the polymerization of the second stage take place entirely or virtually emulsifier-free. In total, preferably, less than 2.5 or less than 2.0 wt % of emulsifier, more particularly less than 1.5 wt %, based on the solids content of the polymer dispersion is used. To stabilize the polymer dispersion formed in the polymerization of the second stage, the polymer of the first stage is used, which is converted in situ, by addition of neutralizing agent, from a water-insoluble polymer which is not active as a protective colloid into a water-soluble or water-swollen polymer which is active as a protective colloid.

The emulsion polymerization of the first and second stages may be initiated using water-soluble initiators. Water-soluble initiators are, for example, ammonium and alkali metal salts of peroxodisulfuric acid, e.g., sodium peroxodisulfate, hydrogen peroxide, or organic peroxides, e.g., tert-butyl hydroperoxide. Also suitable as initiator are what are called reduction/oxidation (redox) initiator systems. The redox initiator systems consist of at least one, usually inorganic, reducing agent and one inorganic or organic oxidizing agent. The oxidizing component comprises, for example, the emulsion polymerization initiators already stated above. The reducing component comprises, for example, alkali metal salts of sulfurous acid, such as sodium sulfite, sodium hydrogensulfite, alkali metal salts of sulfurous acid such as sodium disulfite, bisulfite addition compounds with aliphatic aldehydes and ketones, such as acetone bisulfite, or reducing agents such as hydroxymethanesulfinic acid and its salts, or ascorbic acid, for example. The redox initiator systems may be used together with soluble metal compounds whose metallic component is able to occur in a plurality of valence states. Typical redox initiator systems are, for example, ascorbic acid/iron(II) sulfate/sodium peroxydisulfate, tert-butyl hydroperoxide/sodium disulfite, tert-butyl hydroperoxide/Na-hydroxymethanesulfinic acid. The individual components, the reducing component for example, may also be mixtures—for example, a mixture of the sodium salt of hydroxymethanesulfinic acid and sodium disulfite.

The stated initiators may be used in the form of aqueous solutions, in which case the lower concentration is determined by the amount of water that is acceptable in the dispersion, and the upper concentration by the solubility of the respective compound in water. Generally speaking, the concentration of the initiators is 0.1 to 30 wt %, preferably 0.2 to 20 wt %, more preferably 0.3 to 10 wt %, based on the monomers to be polymerized in the respective stage. It is also possible for two or more different initiators to be used in the emulsion polymerization.

The polymer P1 is admixed with a base. In this case, for example, acid groups of the polymer P1 can be neutralized, more particularly by at least partial feeding of a base before and/or during the polymerization of the second stage. This base may be added in a joint feed with the monomers to be polymerized, or in a separate feed, in particular after the first stage. After all of the monomers of the $2^{nd}$ stage have been fed, the polymerization vessel preferably comprises the amount of base required to neutralize at least 70%, more preferably 70% to 100% or 70% to 95%, of acid equivalents.

The neutralization implemented following the first stage takes place with a base and preferably before the start of the second-stage polymerization. The base results in partial or complete neutralization of the ionic or latent ionic groups of the polymer of the first stage; it may lead to swelling of the polymer particles, or else carry them completely into solution. Preferably only a partial neutralization is performed—for example, at least 70% of the ionic or latent ionic groups present—especially when in the $2^{nd}$ stage or after the polymerization, further epoxy-containing monomers or epoxy-containing auxiliaries and adjuvants are added, as described below within the monomers M or the additives. Bases used may be, for example, alkali metal or alkaline earth metal compounds such as sodium hydroxide, potassium hydroxide, calcium hydroxide, magnesium oxide, sodium carbonate; ammonia; primary, secondary, and tertiary amines, such as ethylamine, propylamine, monoisopropylamine, monobutylamine, hexylamine, ethanolamine, dimethylamine, diethylamine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, dimethylaminopropylamine, neopentanediamine, hexamethylenediamine, 4,9-dioxadodecane-1,12-diamine, polyethylenimine or polyvinylamine.

Ammonia is used preferably as base.

The polymerization can be carried out in the first stage by means of the method of the in situ seed regime. For this, a portion of a monomer or of the monomer mixture of the first stage, as for example <35 wt %, preferably <20 wt %, based on the total weight of the monomers of the first stage, as for example <10 wt %, preferably <3 wt %, based on the total weight of the monomers of the first stage, is included in the initial charge and polymerization is commenced by means of an initiator, after which, subsequently, the remainder of the first stage is metered in.

The monomers of the polymerization of the first stage are selected such that the glass transition temperature calculated for a polymer prepared from the monomers of the first stage is greater than 50° C., more particularly in the range from 50° C. to 150° C. or in the range from 70° C. to 125° C.

Through targeted variation in nature and amount of the monomers it is possible in accordance with the invention for the skilled person to prepare polymer compositions, especially aqueous polymer compositions, whose polymers have a glass transition temperature within the desired range.

Orientation is possible by means of the Fox equation. According to Fox (T. G. Fox, Bull. Am. Phys. Soc. 1956 [Ser. II] 1, page 123 and in accordance with Ullmann's Encyclopädie der technischen Chemie [Encyclopaedia of Industrial Chemistry], vol. 19, page 18, $4^{th}$ edition, Verlag Chemie, Weinheim, 1980), the calculation of the glass transition temperature of copolymers is governed in good approximation by:

$$1/Tg = X^1/Tg^1 + X^2/Tg^2 + \ldots X^n/Tg^n,$$

where $x^1, x^2, \ldots x^n$ are the mass fractions of the monomers $1, 2 \ldots n$ and $Tg^1, Tg^2 \ldots Tg^n$ are the glass transition temperatures, in degrees Kelvin, of the polymers constructed in each case only from one of the monomers 1, 2 . . . n. The Tg values for the homopolymers of the majority of monomers are known and are listed in, for example, Ullmann's Encyclopedia of Industrial Chemistry, $5^{th}$ Ed., vol. A21, page 169, VCH Weinheim, 1992; other sources of glass transition temperatures of homopolymers include, for example, J. Brandrup, E. H. Immergut, Polymer Handbook, $1^{st}$ Ed., J. Wiley, New York 1966, $2^{nd}$ Ed. J. Wiley, New York 1975, and $3^{rd}$ Ed. J. Wiley, New York 1989. For ethyl acrylate a value of −13° C. is used.

The monomers of the polymerization of the second stage are selected such that the glass transition temperature calculated for a polymer prepared from the monomers of the second stage is at least 50° C. lower than that of the first stage, being situated preferably in the range less than 30° C., more particularly in the range from 20° C. to −80° C.

The vinyl monomers used, particularly the monomers of the first stage, comprise monomers having functional groups such as crosslinking groups and hydrophilic, water-dispersible groups. Some functional groups may have more than one function. (Meth)acrylic acid, for example, is normally utilized as a water-dispersible monomer, but here is also able to act as a crosslinking monomer, and react, for example, with epoxide compounds or carbodiimides.

Crosslinking monomers such as acetoacetyl (meth)acrylates or acetoacetoxyethyl (meth)acrylates are used because they are able to enter into crosslinking reactions with themselves and, for example, with polyamines, additionally, they contribute to the wet adhesion. Wet adhesion refers to the flawless adhesion of a coating to a substrate under moist conditions.

Certain functional groups of the monomers contribute to mediating the latent crosslinkability of the composition. In this case, the crosslinking may take place by reaction of the groups with one another and/or by addition of a crosslinking additive. With preference the crosslinking occurs only after the actual formation of a film.

In the polymerization, in the polymerization of the $1^{st}$ and/or $2^{nd}$ composition, at least one of the following monomers may be used as A):

A1) (Cyclo)Alkyl (Meth)Acrylates

This includes preferably those (cyclo)alkyl (meth)acrylates whose linear, cyclic and/or branched alkyl radical has 1 to 20 carbon atoms, more preferably 1 to 10, very preferably 1 to 8, and more particularly 1 to 4 carbon atoms. In the case of cyclic compounds, the alkyl radical has at least 3 carbon atoms.

Examples of (cyclo)alkyl (meth)acrylates are methyl (meth)acrylate, ethyl (meth)acrylate, n-propyl (meth)acrylate, n-butyl (meth)acrylate, isobutyl (meth)acrylate, sec-butyl (meth)acrylate, tert-butyl (meth)acrylate, n-pentyl (meth)acrylate, isopentyl (meth)acrylate, 2-methylbutyl (meth)acrylate, amyl (meth)acrylate, n-hexyl (meth)acrylate, 2-ethylbutyl (meth)acrylate, pentyl (meth)acrylate, n-heptyl (meth)acrylate, n-octyl (meth)acrylate, 2-ethylhexyl (meth)acrylate (2-ethylhexyl acrylate), 2-propylheptyl (meth)acrylate, n-decyl (meth)acrylate, undecyl (meth)acrylate, and n-dodecyl (meth)acrylate and cyclohexyl (meth) acrylate.

Preference is given to methyl methacrylate, methyl acrylate, ethyl acrylate, n-butyl acrylate, n-butyl methacrylate, n-hexyl acrylate, n-octyl acrylate, 2-ethylhexyl acrylate, and 3-propylheptyl acrylate, or mixtures thereof.

A2) Vinylaromatics Having Up to 20 Carbon Atoms

These are optionally substituted aromatic compounds having a vinyl group which is in conjugation with the aromatic ring system.

Such substituted vinylaromatics have one or more, preferably one, alkyl group(s) which is linear or branched and has 1 to 10 carbon atoms, preferably 1 to 6 and more preferably 1 to 4 carbon atoms, and which may be located on the aromatic or on the vinyl group. If the substituent is on the aromatic, then the substituent may be located preferably in ortho- or para-position, more preferably in para-position, to the vinyl group.

Vinylaromatic compounds contemplated include vinyltoluene, vinylnapthalene, α- and p-methylstyrene, α-butylstyrene, 4-n-butylstyrene, 4-n-decylstyrene, and preferably styrene and α-methylstyrene.

A3) Radically Polymerizable Compound

The compounds A3) are selected from the group consisting of ethylenically unsaturated nitriles having up to 20 carbon atoms, vinyl esters of carboxylic acids containing up to 20 carbon atoms, vinyl halides having up to 10 carbon atoms, and vinyl ethers of alcohols containing 1 to 10 carbon atoms, and are preferably selected from the group consisting of ethylenically unsaturated nitriles having up to 20 carbon atoms and vinyl ethers of alcohols containing 1 to 10 carbon atoms, and more preferably are ethylenically unsaturated nitriles having up to 20 carbon atoms.

Ethylenically Unsaturated Nitriles Having Up to 20 Carbon Atoms

Examples of ethylenically unsaturated nitriles are fumaronitrile, acrylonitrile, and methacrylonitrile, preferably acrylonitrile and methacrylonitrile, and more preferably acrylonitrile.

Vinyl Esters of Carboxylic Acids Containing Up to 20 Carbon Atoms

Vinyl esters of carboxylic acids having 1 to 20 carbon atoms are, for example, vinyl laurate, vinyl stearate, vinyl propionate, Versatic acid vinyl esters, vinyl butyrate, and vinyl acetate, preferably vinyl acetate.

Vinyl Halides Having Up to 10 Carbon Atoms

The vinyl halides are ethylenically unsaturated compounds substituted by chlorine, fluorine or bromine, preferably vinyl chloride and vinylidene chloride.

Vinyl Ethers of Alcohols Containing 1 to 10 Carbon Atoms

Examples of vinyl ethers include methyl vinyl ether, ethyl vinyl ether, n-propyl vinyl ether, iso-propyl vinyl ether, n-butyl vinyl ether, sec-butyl vinyl ether, isobutyl vinyl ether, tert-butyl vinyl ether, and n-octyl vinyl ether. Preferred vinyl ethers are those with alcohol containing from 1 to 4 carbon atoms.

B) α,β-Ethylenically Unsaturated Carboxylic Acid

This comprises α,β-ethylenically unsaturated carboxylic acids having 3 to 10, preferably 3 to 6, more preferably 3 to 4 carbon atoms.

The ionic groups may optionally also be latent, as in maleic anhydride, for example, where the acid functionality is present in the form of an anhydride group.

Preferred are (meth)acrylic acid, crotonic acid, or dicarboxylic acids, e.g., itaconic acid, maleic acid or fumaric acid, very preferably methacrylic acid and acrylic acid.

(Meth)acrylic acid in this description stands for methacrylic acid and acrylic acid.

The α,β-ethylenically unsaturated carboxylic acids are used in the first, acid-rich stage in quantities of 5 to 15 wt %, preferably 5 to 10 wt %, and in the second stage at from 0 to 2 wt %, based on the total monomers of the respective stage.

C) Crosslinking Monomer with a Keto or Aldehyde Group

The keto or aldehyde groups are bonded to the polymer preferably by copolymerization of copolymerizable, ethylenically unsaturated compounds having keto or aldehyde groups. Suitable such compounds are acrolein, methacrolein, vinyl alkyl ketones having 1 to 20, preferably 1 to 10, carbon atoms in the alkyl radical, formyl styrene, alkyl (meth)acrylates having one or two keto or aldehyde groups, or one aldehyde and one keto group, in the alkyl radial, with the alkyl radical preferably comprising a total of 3 to 10 carbon atoms, examples being (meth)acryloyloxyalkylpropanals, as described in DE-A-2722097. Also suitable, furthermore, are N-oxoalkyl(meth)acrylamides of the kind known for example from U.S. Pat. No. 4,226,007, DE-A-2061213 or DE-A-2207209. Particularly preferred are acetoacetyl (meth)acrylate and, in particular, acetoacetoxyethyl (meth)acrylate (AAEM).

The crosslinking monomer C) is used preferably in a quantity of 2 to 15 wt %, in the first stage and in a quantity of 1 to 10 wt % in the second stage, based on the total weight of the monomers used for polymerization in the respective stages.

Adhesion Promoters D)

The adhesion promoters D) refer for example to compounds having an amino, urea or an N-heterocyclic group, such as, for example, dialkylaminoalkyl esters, dialkylaminoalkyl amides of acrylic or methacrylic acid, especially those having 1 to 5 carbon atoms in the alkyl group; free radically polymerizable compounds of urea, ethylene urea or propylene urea, and polymerizable imidazolines having an —NC(O)N— group. Further examples are dimethylaminoethyl acrylate, diethylaminoethyl acrylate, dimethylaminopropyl acrylate, 3-dimethylamino-2,2-dimethylpropyl acrylate, 2-N-morpholinoethyl acrylate, 2-N-piperidinoethyl acrylate, N-(3-dimethylaminopropylacrylamides), N-(3-dimethylamino-2, 2-dimethyl-propyl)acrylamide, N-(4-morpholinomethyl)acrylamides, N-(2-methacryloyloxyethyl) ethylene urea, methacrylamidoethylethylene urea, N-(2-methacryloyloxyacetamidoethyl)-N,N,N',N'-ethylene urea, allylalkylethylene urea, N-methacrylamidomethyl urea, N-methacryoyl urea, N-[3-(1, 3-diazocyclohexan-2-on-propyl)]methacrylamide, 2-(1-imidazolyl)ethyl methacrylate, 2-(1-imidazolidin-2-on)ethyl methacrylate, vinylimidazol, vinylpyrrolidones, and 3-allyl-4, 5-methoxy-2-imidazolidinones.

Particularly preferred are N-(2-methacryloyloxyethyl) ethylene urea (ureidomethacrylate) and methacrylamidoethylethylene urea.

A further possibility, following the polymerization of the $1^{st}$ composition or of the polymer P2, is to allow the latter to react subsequently with ethyleneimine or propyleneimine, as described in U.S. Pat. No. 5,739,196A.

The monomers D) are used in the first stage in quantities of 0 to 4 wt % and in the second stage in quantities of 0 to 2 wt %, based on the total weight of the monomers used for the polymerization in the respective stage.

Where tert-butyl acrylate is used in the first stage as monomer E), in quantities of at least 1.5 wt %, based on the total weight of the monomers of the first stage that are used for the polymerization, it is in that case possible to do without the addition of the water-soluble alkoxylated polyamine for achieving satisfactory water resistance. If no tert-butyl acrylate is used in the first stage, then the amount of the water-soluble polyamine used must be greater than 0. The quantity of tert-butyl acrylate used in the first stage is between 0 and 25 wt %, based on the total weight of the monomers of the $1^{st}$ stage that are used for the polymerization, preferably between 1.5 and 25 wt %.

With great preference use is made both of tert-butyl acrylate, in quantities of greater than 0 wt %, and of an at least trifunctional alkoxylated polyamine, more particularly an ethoxylated and/or propoxylated triamine.

It is further possible in minor quantities, from 0 to 10 wt %, based on the total weight of the monomers used for the polymerization of the first and/or the second stage, to use monomers other than those listed above.

Examples of these further monomers M are phosphorus-containing monomers, examples being vinylphosphonic acid and allylphosphonic acid. Additionally suitable are the monoesters and diesters of phosphonic acid and phosphoric acid with hydroxyalkyl (meth)acrylates, especially the monoesters. Additionally suitable are diesters of phosphonic acid and phosphoric acid esterified singly with a hydroxyalkyl (meth)acrylate and additionally singly with an alcohol different therefrom, such as with an alkanol.

Suitable hydroxyalkyl (meth)acrylates as such, and also for these esters, are those identified as separate monomers below, especially 2-hydroxyethyl (meth)acrylate, 3-hydroxypropyl (meth)acrylate, 4-hydroxybutyl (meth)acrylate, etc. Corresponding dihydrogenphosphate ester monomers include phosphoalkyl (meth)acrylates, such as 2-phosphoethyl (meth)acrylate, 2-phosphopropyl (meth)acrylate, 3-phosphopropyl (meth)acrylate, phosphobutyl (meth)acrylate, and 3-phospho-2-hydroxypropyl (meth)acrylate. Also suitable are the esters of phosphonic acid and phosphoric acid with alkoxylated hydroxyalkyl (meth)acrylates, examples being the ethylene oxide condensates of (meth)acrylates, such as $H_2C=C(CH_3)COO(CH_2CH_2O)_nP(OH)_2$ and $H_2C=C(CH_3)COO(CH_2CH_2O)_nP(=O)(OH)_2$, in which n is 1 to 50. Additionally suitable are phosphoalkyl crotonates, phosphoalkyl maleates, phosphoalkyl fumarates, phosphodialkyl (meth)acrylates, phosphodialkyl crotonates, and allyl phosphates. Other suitable monomers containing phosphorus groups are described in WO 99/25780 and U.S. Pat. No. 4,733,005, hereby incorporated by reference.

Additionally suitable are vinylsulfonic acid, allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, and 2-acrylamido-2-methylpropanesulfonic acid. Suitable styrenesulfonic acids and derivatives thereof are styrene-4-sulfonic acid and styrene-3-sulfonic acid and the alkaline earth metal or alkali metal salts thereof, e.g., sodium styrene-3-sulfonate and sodium styrene-4-sulfonate.

Suitable monomers M are also vinyl monomers having alkoxylated side chains, such as, for example, (alkoxy) polyethylene glycol (meth)acrylates, in the form of various products with the Bisomer® designation from Geo Specialty Chemicals, USA. This includes, for example Bisomer® MPEG 350 MA, a methoxypolyethylene glycol monomethacrylate. Further suitable monomers M are vinyl monomers having epoxide groups, such as allyl glycidyl ether and 2,3-epoxypropyl (meth)acrylate. These latter monomers are used preferably in the $2^{nd}$ stage.

As monomers M it is also possible, moreover to use α,β-ethylenically unsaturated carboximides selected from the group consisting of (meth)acrylamide, crotonamide, amides of dicarboxylic acids, or mixtures thereof, more preferably itaconamide, maleamide or fumaramide; especially preferred are methacrylamide and acrylamide.

Further monomers M may also be di- and poly(meth) acrylates such as 1,2-, 1,3- and 1,4-butanediol diacrylate, 1,2- and 1,3-propylene glycol di(meth)acrylate, 1,6-hexanediol di(meth)acrylate, 1,2-ethylene glycol di(meth)acrylate, neopentyl glycol di(meth)acrylate, diethylene glycol di(meth)acrylate, triethylene glycol di(meth)acrylate, tetraethylene glycol di(meth)acrylate, trimethylolpropane tri(meth) acrylate, trimethylolethane tri(meth)acrylate, pentaerythritoltri- and -tetra(meth)acrylate, and also divinylbenzene or allyl (meth)acrylate.

These monomers are used preferably in the $2^{nd}$ stage.

One embodiment of the invention uses at least one chain transfer agent (CTA) in the polymerization of the first stage. By this means it is possible, through a chain termination reaction, to reduce the molar mass of the emulsion polymer. These CTAs are bonded onto the polymer, generally onto the chain end. The amount of the CTAs is in particular 0.05 to 5 parts by weight, more preferably 0.05 to 2 parts by weight, based on 100 parts by weight of the total monomers to be polymerized in the first and second stages. Examples of suitable CTAs are compounds having a thiol group such as tert-butyl mercaptan, alkyl thioglycolates, mercaptoethanol, mercaptopropionic acid, 2-ethylhexyl thioglycolate, mercaptopropyltrimethoxysilane, and n- or tert-dodecyl mercaptan. The CTAs are generally compounds of low molecular mass, having a molar weight of less than 2000, more particularly less than 1000 g/mol.

Particularly preferred are alkyl esters of thioglycolic acid and of mercaptopropionic acid, such as 2-ethylhexyl thioglycolate and isooctyl mercaptopropionate.

Likewise useful as CTA is a catalytic amount of a transition metal complex and, in particular, of a cobalt chelate complex; this technology is known in the field of art as catalytic chain transfer (CCT) polymerization.

A technology of this kind is described in the literature. Various references, as for example N. S. Enikolopyan et al., J. Polym. Sci., Polym. Chem. Ed., volume 19, 879 (1981), disclose, for example, the use of cobalt(II)-porphyrin complexes as chain transfer agents in radical polymerization, while U.S. Pat. No. 4,526,945 discloses for this purpose the use of dioxime complexes of cobalt(II). Various other publications, examples being U.S. Pat. No. 4,680,354, EP-A-0 196 783, and EP-A-0 199 436, describe the use of certain and other types of cobalt(II) chelates as chain transfer agents for the preparation of oligomers from olefinically unsaturated monomers by radical polymerization. WO-A-87/03605, on the other hand, claims the use of certain cobalt(II) chelate complexes for this purpose, and also the use of certain chelate complexes of other metals, such as iridium and rhenium, for example.

The metal chelate complexes which are disclosed in these references, and also the specific polymerization techniques disclosed therein for the implementation of the catalytic chain transfer polymerization, are incorporated here by this reference.

The weight-average molecular weight of the monomers of the polymerization of the first stage is between 2 and 35 kDa, preferably between 5 and 20 kDa. The weight-average molecular weight of the second stage is preferably greater than 50 kDa. The molecular weights were determined by size exclusion chromatography.

The weight ratio of acid-rich first stage to the hydrophobic second stage is preferably in the range from 20/80 to 50/50.

The water-soluble alkoxylated triamine added subsequent to the polymerization of P1 and P2 refers to an ethoxylated and/or propoxylated triamine having an average molecular weight of 140 to 5000. Such polyoxyalkylenetriamines and their preparation are disclosed in DE 38 25 637 and in WO2004056903, the disclosure content of which is hereby incorporated expressly by reference and is intended to be part of the present specification with regard to the disclosure of these compounds.

Examples of commercially available ethoxylated and/or propoxylated triamines are Jeffamine® T403 (from Huntsman) or Baxxodur® EC310 (from BASF SE).

Preference is given to using a propoxylated triamine subsequent to the polymerization of P1 and P2.

The ratio of the propoxylated triamine used, relative to the keto- and/or aldehyde-functional monomer C), is 1:1 to 1:9 (molar).

In the polymer dispersion of the invention, the $1^{st}$ composition preferably comprises
- A) 33-93 wt % of at least one (cyclo)alkyl (meth)acrylate having a Tg of greater than 50° C., and also 0 to 60 wt % of a (cyclo)alkyl (meth)acrylate having a Tg of less than 0° C.,
- B) 5-15 wt % of at least one α,β-ethylenically unsaturated carboxylic acid,
- C) 2-15 wt % of at least one crosslinking monomer with a keto or aldehyde group,
- D) 0-4 wt % of at least one adhesion promoter,
- E) 0-25 wt % of tert-butyl acrylate,
- F) 0-10 wt % of monomers M,
- where the quantity figures for A) to F) are based in each case on 100 wt % of the monomers to be polymerized in the $1^{st}$ composition.

The expression "where the quantity figures are based in each case on 100 wt % of the monomers to be polymerized in the $1^{st}$ composition" can be equated with "where the weight fractions add up to 100 wt % in each case". In other words, this means that A) to F) add up to a total of 100 wt %.

In the polymer dispersion of the invention, the $2^{nd}$ composition preferably comprises
- A) 0-55 wt % of at least one (cyclo)alkyl (meth)acrylate and/or a vinylaromatic monomer having a Tg of greater than 50° C., and also 44 to 99 wt % of a (cyclo)alkyl (meth)acrylate having a Tg of less than 0° C.,
- B) 0-2 wt % of at least one α,β-ethylenically unsaturated carboxylic acid,
- C) 1-10 wt % of at least one crosslinking monomer with a keto or aldehyde group,
- D) 0-2 wt % of at least one adhesion promoter,
- E) 0-10 wt % of monomers M,
- where the quantity figures for A) to F) are based in each case on 100 wt % of the monomers to be polymerized in the 2nd composition.

Furthermore, customary auxiliaries and adjuvants may be added to the polymer dispersions. They include, for example, pH modifiers, reducing agents, and bleaches, such as the alkali metal salts of hydroxymethanesulfinic acid (e.g., Rongalit® C from BASF Aktiengesellschaft), complexing agents, deodorants, odorants, and viscosity modifiers, such as alcohols, examples being glycerol, methanol, ethanol, tert-butanol, glycol, etc. These auxiliaries and adjuvants may be added to the polymer dispersions in the initial charge, to one of the feeds, or after the end of the polymerization.

As auxiliaries and adjuvants it is also possible to use water-soluble or -dispersible epoxy silanes. These may serve to improve the adhesion to diverse substrates, and also to reduce further the water-sensitivity of the coating, by reaction with the carboxylic acid groups present in the polymer dispersion. Additionally they may lead to further crosslinking of the coating, through condensation reactions of the silane groups. One of the references to describe such silanes is WO 98/14511. Typical examples are glycidoxypropyltri(m)ethoxysilane (Geniosil GF 80 and 82 from Wacker) or 3-glycidoxypropylmethyldiethoxysilanes (CoatOSil or Silquest brands from Momentive).

The solids content of the dispersion is preferably 25-55 wt %, based on the total amount of liquid components of the dispersion. With particular preference the solids content is 30-50 wt %.

In the polymer dispersion of the invention, the particle size of the polymer of the first and/or the second stage is preferably in a range from 1 nm to 100 nm, more particularly in a range from 5 nm to 75 nm, and very preferably in a range from 25 to 65 nm. The particle size of the polymer of the invention was determined by means of hydrodynamic chromatography (HDC).

The coating material of the invention is employed preferably in aqueous paints and varnishes. These paints and varnishes take the form, for example, of an unpigmented system (clearcoat or clear varnish) or of a pigmented system. The fraction of the pigments may be described by the pigment volume concentration (PVC). The PVC describes the ratio of the volume of pigments ($V_P$) and fillers ($V_F$) to the total volume, consisting of the volumes of binder ($V_B$), pigments, and fillers, of a dried coating film, in percent: $PVC=(V_P+V_F)\times 100/(V_P+V_F+V_B)$. Paints and varnishes can be categorized on the basis of the PVC, for example, as follows:

| | |
|---|---|
| highly filled interior paint, wash resistant, white/matt about | 85 |
| interior paint, scrub resistant, white/matt about | 80 |
| semigloss paint, satin-matt about | 35 |
| semigloss paint, satin-gloss about | 25 |
| high-gloss paint about | 15-25 |
| exterior architectural paint, white about | 45-55 |
| clear varnish | <5 |

These dispersions are used preferably at PVC<50, more preferably PVC<35, and more preferably still in systems with low filler content (PVC<23) and in clear varnishes (PVC<5).

Suitable fillers in clear varnish systems are, for example, matting agents, which as desired greatly detract from the gloss. Matting agents are generally transparent and may be organic or inorganic. Inorganic fillers based on silica are most suitable and are widely available commercially. Examples are the Syloid® products from W.R. Grace & Company and the Acematt® products from Evonik GmbH. Organic matting agents are available, for example, from BYK-Chemie GmbH under the Ceraflour® and Ceramat® brands, and from Deuteron GmbH under the Deuteron MK® brand. Other suitable fillers for emulsion paints are aluminosilicates, such as feldspars, silicates, such as kaolin, talc, mica, magnesite, alkaline earth metal carbonates, such as calcium carbonate, in the form of calcite or chalk, for example, magnesium carbonate, dolomite, alkaline earth metal sulfates, such as calcium sulfate, silicon dioxide, etc. In paints and varnishes, naturally, finely divided fillers are preferred. The fillers may be used as individual components. In the art, however, filler mixtures have proven particularly appropriate, examples being calcium carbonate/kaolin, calcium carbonate/talc. Glossy paints and varnishes generally only have small amounts of very finely divided fillers, or comprise no fillers.

Finely divided fillers may also be used for increasing the hiding power and/or for saving on white pigments. For setting of the hiding power, of the hue and of the depth of color, preference is given to using blends of color pigments and fillers.

Suitable pigments are, for example, inorganic white pigments such as titanium dioxide, preferably in the rutile form, barium sulfate, zinc oxide, zinc sulfide, basic lead carbonate, antimony trioxide, lithopone (zinc sulfide+barium sulfate), or colored pigments, examples being iron oxides, carbon black, graphite, zinc yellow, zinc green, ultramarine, manganese black, antimony black, manganese violet, Paris blue or Schweinfurt green. Besides the inorganic pigments, the emulsion paints of the invention may also comprise organic color pigments, examples being sepia, gamboge, Cassel brown, toluidine red, para red, Hansa yellow, indigo, azo dyes, anthraquinonoid and indigoid dyes, and also dioxazine, quinacridone, phthalocyanine, isoindolinone, and metal-complex pigments. Also suitable are synthetic white pigments with air inclusions to increase light scattering, such as the Ropaque® and AQACell® dispersions. Additionally suitable are the Luconyl® products from BASF SE, such as Luconyl® yellow, Luconyl® brown, and Luconyl® red, especially the transparent variants.

Besides the polymer dispersion, the coating material of the invention, also called aqueous paint or varnish, may optionally comprise additional, film-forming polymers, pigments, and other additives.

The customary additives (auxiliaries) include wetting or dispersing agents, such as sodium, potassium, or ammonium polyphosphates, alkali metal and ammonium salts of acrylic acid or maleic anhydride copolymers, polyphosphonates, such as sodium 1-hydroxyethane-1,1-diphosphonate, and also salts of naphthalenesulfonic acids, more particularly their sodium salts.

Important additives are the film-forming auxiliaries, the thickeners, and defoamers. Examples of suitable film-forming auxiliaries are Texanol® from Eastman Chemicals, and the glycol ethers and glycol esters available commercially, for example, from BASF SE, under the names Solvenon® and Lusolvan®, and from Dow under the tradename Dowanol®. The amount is preferably <10 wt % and more preferably <5 wt %, based on the total formulation. It is also possible to carry out formulation entirely without solvents.

Further suitable additives are flow control agents, defoamers, biocides, and thickeners. Examples of suitable thickeners are associative thickeners, such as polyurethane thickeners. The amount of the thickener is preferably less than 2.5 wt %, more preferably less than 1.5 wt %, of thickener, based on the solids content of the paint or varnish. Further formulating information for wood coatings is described at length in "Waterbased acrylates for decorative coatings" by the authors M. Schwartz and R. Baumstark, ISBN 3-87870-726-6.

A further subject of the present invention is the use of the polymer dispersion of the invention for coating compositions.

A further subject of the present invention is the use of the polymer dispersion of the invention for paints and varnishes.

The paints and varnishes of the invention are produced in a known way by blending the components in mixing equipment customary for the purpose. It has proven appropriate to make an aqueous paste or dispersion from the pigments, the water, and optionally the additives, and only then to mix the polymeric binder—that is, generally, the aqueous dispersion of the polymer—with the pigment paste or pigment dispersion.

The paint or varnish of the invention may be applied to substrates in a customary way, by means of spreading, spraying, dipping, rolling and/or knifecoating, for example.

The paints and varnishes of the invention are distinguished by ease of handling and good working properties. The paints and varnishes have a low pollutant content. They have good performance properties, exemplified by good water resistance, good wet adhesion, and good blocking resistance; they are easily recoated, and on application they display good flow. The equipment used is easily cleaned with water.

All embodiments and preferred embodiments set out above can be combined freely with one another, unless the context clearly dictates otherwise.

In particular, the expression "comprising", or the expression "comprises", encompasses the expressions "consisting" or "consisting of".

Further advantages and advantageous embodiments of the subjects of the invention are illustrated by FIG. 1 and elucidated in the description hereinafter. It should be borne in mind here that the drawing is merely descriptive in nature and is not intended to restrict the invention in any form whatsoever. In the drawing:

FIG. 1 shows drawdowns onto glass of the formulation according to the invention after two-day drying at RT and two-hour contact with water.

FIG. 1 shows four different coatings comprising the formulation of the invention on glass plate, to which, after drying at room temperature (RT) in the lower region, DI water (fully demineralized water) was placed. The formulations comprise a polymer dispersion with crosslinking monomer only in the first stage (CE 1A and 1C), and also this monomer in both stages (IE 1A and 1C, inventive). It can be seen that the coatings based on the polymer dispersions of the invention show no instances of destruction or damage of the surfaces.

The invention is elucidated in more detail by the examples hereinafter.

INVENTIVE EXAMPLE 1 (IE1)

A polymerization vessel equipped with metering devices and temperature regulation was charged at 20 to 25° C. (room temperature) under a nitrogen atmosphere with

| | |
|---|---|
| 722.1 g | of deionized water and |
| 30.8 g | of 15 wt % aqueous solution of sodium lauryl sulfate | and this initial charge was heated to 80° C. with stirring. When this temperature had been reached, the entire feed 1 was added and stirring took place for 2 minutes. Thereafter feed 2 was commenced and was metered in over the course of 45 minutes. After the end of feed 2, polymerization was continued for 10 minutes, then feed 3 was added and stirred in for 10 minutes. The weight-average molecular weight of the polymer in a sample taken at this point in time was around 8.6 kDa. Subsequently feed 4a was commenced and was metered in 45 minutes. After that, immediately feed 4b and, in parallel with it, feed 5 were commenced and were metered in 45 minutes.

Feed 1 (homogeneous solution of):

| | |
|---|---|
| 55.8 g | of deionized water and |
| 4.2 g | of sodium peroxodisulfate |

Feed 2 (homogeneous mixture of):

| | |
|---|---|
| 369.5 g | of deionized water |
| 20.5 g | of a 15 wt % aqueous solution of sodium lauryl sulfate |
| 53.2 g | of methacrylic acid |
| 19.0 g | of a 25 wt % solution of ureidomethacrylate in methyl methacrylate |
| 331.7 g | of methyl methacrylate |
| 24.5 g | of n-butyl acrylate |
| 47.6 g | of acetoacetoxyethyl methacrylate |
| 21.9 g | of 2-ethylhexyl thioglycolate |

Feed 3:

| | |
|---|---|
| 42.1 g | of a 25 wt % ammonia solution |

Feed 4a (homogeneous mixture of):

| | |
|---|---|
| 181.8 g | of deionized water |
| 17.7 g | of a 15 wt % aqueous solution of sodium lauryl sulfate |
| 311.9 g | of n-butyl acrylate |
| 123.2 g | of styrene |
| 23.8 g | of acetoacetoxyethyl methacrylate |
| 6.3 g | of allyl glycidyl ether |

Feed 4b (homogeneous mixture of):

| | |
|---|---|
| 181.8 g | of deionized water |
| 17.7 g | of a 15 wt % aqueous solution of sodium lauryl sulfate |
| 311.9 g | of n-butyl acrylate |
| 123.2 g | of styrene |
| 23.8 g | of acetoacetoxyethyl methacrylate |

Feed 5 (homogeneous solution of):

| | |
|---|---|
| 9.3 g | of deionized water and |
| 0.7 g | of sodium peroxodisulfate |

After the end of feeds 4b and 5, the polymerization mixture was left to react further at 80° C. for 30 minutes; then 117 g of deionized water were added and stirring was carried out at 80° C. for 60 minutes more.

Subsequently a further 105 g of deionized water were added and the aqueous polymer dispersion obtained was cooled to room temperature. Lastly, the dispersion was filtered through a 125 μm filter.

The resulting 3307 g of the aqueous polymer dispersion had a solids content of 43.3 wt % and a pH of 7.4. The MFFT was ≤0° C. The weight-average molecular weight of the polymer of the dispersion was around 800 kDa. On dilution with deionized water, the aqueous polymer dispersion has a weight-average particle diameter of 36 nm.

INVENTIVE EXAMPLE 1A (IE 1A)

500.0 g of inventive example 1 were introduced and with stirring 60.2 g of a 25 wt % aqueous solution of Jeffamin® T403 (from Huntsman) were added. Stirring was continued for 10 minutes, after which the dispersion was filtered through a 125 μm filter.

Solids content of the mixture was 41.3 wt %, pH was 9.5.

INVENTIVE EXAMPLE 1B (IE 1B)

500.0 g of inventive example 1 were introduced and with stirring 40.5 g of a 25 wt % aqueous solution of Jeffamin® T403 were added. Stirring was continued for 10 minutes, after which the dispersion was filtered through a 125 μm filter.

Solids content of the mixture was 42.3 wt %, pH was 8.7.

INVENTIVE EXAMPLE 1C (IE 1C)

500.0 g of inventive example 1 were introduced and with stirring 20.7 g of a 25 wt % aqueous solution of Jeffamin® T403 were added. Stirring was continued for 10 minutes, after which the dispersion was filtered through a 125 μm filter.

Solids content of the mixture was 42.7 wt %, pH was 7.9.

INVENTIVE EXAMPLE 2 (IE2)

A polymerization vessel equipped with metering devices and temperature regulation was charged at 20 to 25° C. (room temperature) under a nitrogen atmosphere with 728.0 g of deionized water and 30.8 g of 15 wt % aqueous solution of sodium lauryl sulfate and this initial charge was heated to 80° C. with stirring. When this temperature had been reached, the entire feed 1 was added and stirring took place for 2 minutes. Thereafter feed 2 was commenced and was metered in over the course of 45 minutes. After the end of feed 2, polymerization was continued for 10 minutes, then feed 3 was added and stirred in for 10 minutes. Subsequently feed 4a was commenced and was metered in 45 minutes. After that, immediately feed 4b and, in parallel with it, feed 5 were commenced and were metered in 45 minutes.

Feed 1 (homogeneous solution of):

| | |
|---|---|
| 55.8 g | of deionized water and |
| 4.2 g | of sodium peroxodisulfate |

Feed 2 (homogeneous mixture of):

| | |
|---|---|
| 369.5 g | of deionized water |
| 20.5 g | of a 15 wt % aqueous solution of sodium lauryl sulfate |
| 53.2 g | of methacrylic acid |
| 350.7 g | of methyl methacrylate |
| 24.5 g | of n-butyl acrylate |
| 47.6 g | of acetoacetoxyethyl methacrylate |
| 21.9 g | of 2-ethylhexyl thioglycolate |

Feed 3:

| | |
|---|---|
| 31.6 g | of a 25 wt % ammonia solution |

Feed 4a (homogeneous mixture of):

| | |
|---|---|
| 163.8 g | of deionized water |
| 17.7 g | of a 15 wt % aqueous solution of sodium lauryl sulfate |
| 310.1 g | of n-butyl acrylate |
| 121.8 g | of styrene |
| 23.8 g | of acetoacetoxyethyl methacrylate |
| 6.3 g | of allyl glycidyl ether |

Feed 4b (homogeneous mixture of):

| | |
|---|---|
| 197.8 g | of deionized water |
| 17.7 g | of a 15 wt % aqueous solution of sodium lauryl sulfate |
| 313.6 g | of n-butyl acrylate |
| 124.6 g | of styrene |
| 23.8 g | of acetoacetoxyethyl methacrylate |

Feed 5 (homogeneous solution of):

| | |
|---|---|
| 9.3 g | of deionized water and |
| 0.7 g | of sodium peroxodisulfate |

After the end of feeds 4b and 5, the polymerization mixture was left to react further at 80° C. for 30 minutes; then 117 g of deionized water were added and stirring was carried out at 80° C. for 60 minutes more.

Subsequently a further 105 g of deionized water were added and the aqueous polymer dispersion obtained was cooled to room temperature. Lastly, the dispersion was filtered through a 125 µm filter.

The resulting 3291 g of the aqueous polymer dispersion had a solids content of 43.5 wt % and a pH of 7.3. The MFFT was ≤0° C. On dilution with deionized water, the aqueous polymer dispersion has a weight-average particle diameter of 40 nm.

INVENTIVE EXAMPLE 2A (IE 2A)

500.0 g of inventive example 2 were introduced and with stirring
39.5 g of a 25 wt % aqueous solution of Jeffamin T403 were added. Stirring was continued for 10 minutes, after which the dispersion was filtered through a 125 µm filter. Solids content of the mixture was 42.2 wt %, pH was 8.7.

COMPARATIVE EXAMPLE 1 (CE1)

A polymerization vessel equipped with metering devices and temperature regulation was charged at 20 to 25° C. (room temperature) under a nitrogen atmosphere with

| | |
|---|---|
| 722.1 g | of deionized water and |
| 30.8 g | of 15 wt % aqueous solution of sodium lauryl sulfate | and this initial charge was heated to 80° C. with stirring. When this temperature had been reached, the entire feed 1 was added and stirring took place for 2 minutes. Thereafter feed 2 was commenced and was metered in over the course of 45 minutes. After the end of feed 2, polymerization was continued for 10 minutes, then feed 3 was added and stirred in for 10 minutes. The weight-average molecular weight of the polymer in a sample taken at this point in time was around 8.8 kDa. Subsequently feed 4a was commenced and was metered in 45 minutes. After that, immediately feed 4b and, in parallel with it, feed 5 were commenced and were metered in 45 minutes.

Feed 1 (homogeneous solution of):

| | |
|---|---|
| 55.8 g | of deionized water and |
| 4.2 g | of sodium peroxodisulfate |

Feed 2 (homogeneous mixture of):

| | |
|---|---|
| 369.5 g | of deionized water |
| 20.5 g | of a 15 wt % aqueous solution of sodium lauryl sulfate |
| 53.2 g | of methacrylic acid |
| 19.0 g | of a 25 wt % solution of ureidomethacrylate in methyl methacrylate |
| 306.2 g | of methyl methacrylate |
| 2.4 g | of n-butyl acrylate |
| 95.2 g | of acetoacetoxyethyl methacrylate |
| 21.9 g | of 2-ethylhexyl thioglycolate |

Feed 3:

| | |
|---|---|
| 42.1 g | of a 25 wt % ammonia solution |

Feed 4a (homogeneous mixture of):

| | |
|---|---|
| 181.8 g | of deionized water |
| 17.7 g | of a 15 wt % aqueous solution of sodium lauryl sulfate |
| 323.4 g | of n-butyl acrylate |
| 135.5 g | of styrene |
| 6.3 g | of allyl glycidyl ether |

Feed 4b (homogeneous mixture of):

| | |
|---|---|
| 181.8 g | of deionized water |
| 17.7 g | of a 15 wt % aqueous solution of sodium lauryl sulfate |

-continued

| 322.7 g | of n-butyl acrylate |
| 136.2 g | of styrene |

Feed 5 (homogeneous solution of):

| 9.3 g | of deionized water and |
| 0.7 g | of sodium peroxodisulfate |

After the end of feeds 4b and 5, the polymerization mixture was left to react further at 80° C. for 30 minutes; then 117 g of deionized water were added and stirring was carried out at 80° C. for 60 minutes more.

Subsequently a further 105 g of deionized water were added and the aqueous polymer dispersion obtained was cooled to room temperature. Lastly, the dispersion was filtered through a 125 μm filter.

The resulting 3307 g of the aqueous polymer dispersion had a solids content of 43.5 wt % and a pH of 7.3. The MFFT was ≤0° C. The weight-average molecular weight of the polymer of the dispersion was around 810 kDa. On dilution with deionized water, the aqueous polymer dispersion has a weight-average particle diameter of 38 nm.

COMPARATIVE EXAMPLE 1A (CE 1A)

500.0 g of comparative example 1 were introduced and with stirring
60.2 g of a 25 wt % aqueous solution of Jeffamin® T403 were added. Stirring was continued for 10 minutes, after which the dispersion was filtered through a 125 μm filter. Solids content of the mixture was 41.6 wt %, pH was 9.3.

COMPARATIVE EXAMPLE 1B (CE 1B)

500.0 g of comparative example 1 were introduced and with stirring
40.5 g of a 25 wt % aqueous solution of Jeffamin® T403 were added. Stirring was continued for 10 minutes, after which the dispersion was filtered through a 125 μm filter. Solids content of the mixture was 42.0 wt %, pH was 8.5.

COMPARATIVE EXAMPLE 1C (CE 1C)

500.0 g of comparative example 1 were introduced and with stirring
20.7 g of a 25 wt % aqueous solution of Jeffamin® T403 were added. Stirring was continued for 10 minutes, after which the dispersion was filtered through a 125 μm filter. Solids content of the mixture was 43.1 wt %, pH was 7.8.

COMPARATIVE EXAMPLE 2 (CE2)

A polymerization vessel equipped with metering devices and temperature regulation was charged at 20 to 25° C. (room temperature) under a nitrogen atmosphere with

| 722.1 g | of deionized water and |
| 30.8 g | of 15 wt % aqueous solution of sodium lauryl sulfate | and this initial charge was heated to 80° C. with stirring. When this temperature had been reached, the entire feed 1 was added and stirring took place for 2 minutes. Thereafter feed 2 was commenced and was metered in over the course of 45 minutes. After the end of feed 2, polymerization was continued for 10 minutes, then feed 3 was added and stirred in for 10 minutes. Subsequently feed 4 was commenced and was metered in 90 minutes. When the first half of feed 4 had been metered, feed 5 was commenced and was metered in parallel to the remaining feed 4 in 45 minutes.

Feed 1 (homogeneous solution of):

| 55.8 g | of deionized water and |
| 4.2 g | of sodium peroxodisulfate |

Feed 2 (homogeneous mixture of):

| 369.5 g | of deionized water |
| 20.5 g | of a 15 wt % aqueous solution of sodium lauryl sulfate |
| 53.2 g | of methacrylic acid |
| 350.7 g | of methyl methacrylate |
| 24.5 g | of n-butyl acrylate |
| 47.6 g | of acetoacetoxyethyl methacrylate |
| 21.9 g | of 2-ethylhexyl thioglycolate |

Feed 3:

| 42.1 g | of a 25 wt % ammonia solution |

Feed 4 (homogeneous mixture of):

| 361.6 g | of deionized water |
| 35.5 g | of a 15 wt % aqueous solution of sodium lauryl sulfate |
| 627.2 g | of n-butyl acrylate |
| 249.2 g | of styrene |
| 47.6 g | of acetoacetoxyethyl methacrylate |

Feed 5 (homogeneous solution of):

| 9.3 g | of deionized water and |
| 0.7 g | of sodium peroxodisulfate |

After the end of feeds 4 and 5, the polymerization mixture was left to react further at 80° C. for 30 minutes; then 117 g of deionized water were added and stirring was carried out at 80° C. for 60 minutes more.

Subsequently a further 105 g of deionized water were added and the aqueous polymer dispersion obtained was cooled to room temperature. Lastly, the dispersion was filtered through a 125 μm filter.

The resulting 3296 g of the aqueous polymer dispersion had a solids content of 43.3 wt % and a pH of 7.3. The MFFT was ≤0° C. On dilution with deionized water, the aqueous polymer dispersion has a weight-average particle diameter of 40 nm.

COMPARATIVE EXAMPLE 2A (CE 2A)

500.0 g of comparative example 2 were introduced and with stirring
39.5 g of a 25 wt % aqueous solution of Jeffamin T403 were added. Stirring was continued for 10 minutes, after which the dispersion was filtered through a 125 μm filter. Solids content of the mixture was 41.8 wt %, pH was 9.3.

INVENTIVE EXAMPLE 3 (IE3)

A polymerization vessel equipped with metering devices and temperature regulation was charged at 20 to 25° C. (room temperature) under a nitrogen atmosphere with

| | |
|---|---|
| 722.1 g | of deionized water and |
| 30.8 g | of 15 wt % aqueous solution of sodium lauryl sulfate | and this initial charge was heated to 80° C. with stirring. When this temperature had been reached, the entire feed 1 was added and stirring took place for 2 minutes. Thereafter feed 2 was commenced and was metered in over the course of 45 minutes. After the end of feed 2, polymerization was continued for 10 minutes, then feed 3 was added and stirred in for 10 minutes. The weight-average molecular weight of the polymer in a sample taken at this point in time was around 7.8 kDa. Subsequently feed 4 was commenced and was metered in 90 minutes. When the first half of the 4 had been metered, feed 5 was commenced and was metered in parallel to the remaining feed 4 in 45 minutes.

Feed 1 (homogeneous solution of):

| | |
|---|---|
| 55.8 g | of deionized water and |
| 4.2 g | of sodium peroxodisulfate |

Feed 2 (homogeneous mixture of):

| | |
|---|---|
| 283.2 g | of deionized water |
| 20.5 g | of a 15 wt % aqueous solution of sodium lauryl sulfate |
| 47.6 g | of methacrylic acid |
| 38.1 g | of a 25 wt % solution of ureidomethacrylate in methyl methacrylate |
| 239.1 g | of methyl methacrylate |
| 103.6 g | of tert-butyl acrylate |
| 47.6 g | of acetoacetoxyethyl methacrylate |
| 22.0 g | of 2-ethylhexyl thioglycolate |

Feed 3:

| | |
|---|---|
| 37.6 g | of a 25 wt % ammonia solution |

Feed 4 (homogeneous mixture of):

| | |
|---|---|
| 339.2 g | of deionized water |
| 35.5 g | of a 15 wt % aqueous solution of sodium lauryl sulfate |
| 639.8 g | of n-butyl acrylate |
| 260.4 g | of styrene |
| 23.8 g | of acetoacetoxyethyl methacrylate |

Feed 5 homogeneous solution of):

| | |
|---|---|
| 9.3 g | of deionized water and |
| 0.7 g | of sodium peroxodisulfate |

After the end of feeds 4 and 5, the polymerization mixture was left to react further at 80° C. for 30 minutes; then 117 g of deionized water were added and stirring was carried out at 80° C. for 60 minutes more.

Subsequently a further 69 g of deionized water were added and the aqueous polymer dispersion obtained was cooled to room temperature. Lastly, the dispersion was filtered through a 125 μm filter.

The resulting 3146.9 g of the aqueous polymer dispersion had a solids content of 43.5 wt % and a pH of 7.6. The MFFT was ≤0° C. The weight-average molecular weight of the polymer in the dispersion was around 720 kDa. On dilution with deionized water, the aqueous polymer dispersion has a weight-average particle diameter of 45 nm.

INVENTIVE EXAMPLE 4 (IE4)

A polymerization vessel equipped with metering devices and temperature regulation was charged at 20 to 25° C. (room temperature) under a nitrogen atmosphere with

| | |
|---|---|
| 722.1 g | of deionized water and |
| 30.8 g | of 15 wt % aqueous solution of sodium lauryl sulfate | and this initial charge was heated to 80° C. with stirring. When this temperature had been reached, the entire feed 1 was added and stirring took place for 2 minutes. Thereafter feed 2 was commenced and was metered in over the course of 45 minutes. After the end of feed 2, polymerization was continued for 10 minutes, then feed 3 was added and stirred in for 10 minutes. The weight-average molecular weight of the polymer in a sample taken at this point in time was around 7.7 kDa. Subsequently feed 4 was commenced and was metered in 90 minutes. When the first half of feed 4 had been metered, feed 5 was commenced and was metered in parallel to the remaining feed 4 in 45 minutes.

Feed 1 (homogeneous solution of):

| | |
|---|---|
| 55.8 g | of deionized water and |
| 4.2 g | of sodium peroxodisulfate |

Feed 2 (homogeneous mixture of):

| | |
|---|---|
| 283.2 g | of deionized water |
| 20.5 g | of a 15 wt % aqueous solution of sodium lauryl sulfate |
| 47.6 g | of methacrylic acid |
| 38.1 g | of a 25 wt % solution of ureidomethacrylate in methyl methacrylate |
| 239.1 g | of methyl methacrylate |
| 103.6 g | of tert-butyl acrylate |
| 47.6 g | of acetoacetoxyethyl methacrylate |
| 22.0 g | of 2-ethylhexyl thioglycolate |

Feed 3:

| | |
|---|---|
| 37.6 g | of a 25 wt % ammonia solution |

Feed 4 (homogeneous mixture of):

| | |
|---|---|
| 339.2 g | of deionized water |
| 35.5 g | of a 15 wt % aqueous solution of sodium lauryl sulfate |
| 656.6 g | of n-butyl acrylate |
| 243.6 g | of styrene |
| 23.8 g | of acetoacetoxyethyl methacrylate |

Feed 5 (homogeneous solution of):

| | |
|---|---|
| 9.3 g | of deionized water and |
| 0.7 g | of sodium peroxodisulfate |

After the end of feeds 4 and 5, the polymerization mixture was left to react further at 80° C. for 30 minutes; then 117 g of deionized water were added and stirring was carried out at 80° C. for 60 minutes more.

Subsequently a further 69 g of deionized water were added and the aqueous polymer dispersion obtained was cooled to room temperature. Lastly, the dispersion was filtered through a 125 μm filter.

The resulting 3146.9 g of the aqueous polymer dispersion had a solids content of 45.0 wt % and a pH of 7.5. The MFFT was ≤0° C. The weight-average molecular weight of the polymer in the dispersion was around 730 kDa. On dilution with deionized water, the aqueous polymer dispersion has a weight-average particle diameter of 45 nm.

INVENTIVE EXAMPLE 5 (IE5)

A polymerization vessel equipped with metering devices and temperature regulation was charged at 20 to 25° C. (room temperature) under a nitrogen atmosphere with

| | |
|---|---|
| 726.6 g | of deionized water and |
| 30.8 g | of 15 wt % aqueous solution of sodium lauryl sulfate | and this initial charge was heated to 80° C. with stirring. When this temperature had been reached, the entire feed 1 was added and stirring took place for 2 minutes. Thereafter feed 2 was commenced and was metered in over the course of 45 minutes. After the end of feed 2, polymerization was continued for 10 minutes, then feed 3 was added and stirred in for 10 minutes. Subsequently feed 4 was commenced and was metered in 90 minutes. When the first half of feed 4 had been metered, feed 5 was commenced and was metered in parallel to the remaining feed 4 in 45 minutes.

Feed 1 (homogeneous solution of):

| | |
|---|---|
| 55.8 g | of deionized water and |
| 4.2 g | of sodium peroxodisulfate |

Feed 2 (homogeneous mixture of):

| | |
|---|---|
| 369.5 g | of deionized water |
| 20.5 g | of a 15 wt % aqueous solution of sodium lauryl sulfate |
| 47.6 g | of methacrylic acid |
| 282.8 g | of methyl methacrylate |
| 98.0 g | of tert-butyl acrylate |
| 47.6 g | of acetoacetoxyethyl methacrylate |
| 21.9 g | of 2-ethylhexyl thioglycolate |

Feed 3:

| | |
|---|---|
| 37.6 g | of a 25 wt % ammonia solution |

Feed 4 (homogeneous mixture of):

| | |
|---|---|
| 361.6 g | of deionized water |
| 35.5 g | of a 15 wt % aqueous solution of sodium lauryl sulfate |
| 627.2 g | of n-butyl acrylate |
| 249.2 g | of styrene |
| 47.6 g | of acetoacetoxyethyl methacrylate |

Feed 5 (homogeneous solution of):

| | |
|---|---|
| 9.3 g | of deionized water and |
| 0.7 g | of sodium peroxodisulfate |

After the end of feeds 4 and 5, the polymerization mixture was left to react further at 80° C. for 30 minutes; then 117 g of deionized water were added and stirring was carried out at 80° C. for 60 minutes more.

Subsequently a further 105 g of deionized water were added and the aqueous polymer dispersion obtained was cooled to room temperature. Lastly, the dispersion was filtered through a 125 μm filter.

The resulting 3296 g of the aqueous polymer dispersion had a solids content of 43.5 wt % and a pH of 7.6. The MFFT was ≤0° C. On dilution with deionized water, the aqueous polymer dispersion has a weight-average particle diameter of 45 nm.

INVENTIVE EXAMPLE 5A (IE 5A)

500.0 g of inventive example 5 were introduced and with stirring 39.5 g of a 25 wt % aqueous solution of Jeffamin T403 were added. Stirring was continued for 10 minutes, after which the dispersion was filtered through a 125 μm filter. Solids content of the mixture was 42.3 wt %, pH was 9.5.

COMPARATIVE EXAMPLE 3 (CE3)

A polymerization vessel equipped with metering devices and temperature regulation was charged at 20 to 25° C. (room temperature) under a nitrogen atmosphere with

| | |
|---|---|
| 722.1 g | of deionized water and |
| 30.8 g | of 15 wt % aqueous solution of sodium lauryl sulfate | and this initial charge was heated to 80° C. with stirring. When this temperature had been reached, the entire feed 1 was added and stirring took place for 2 minutes. Thereafter feed 2 was commenced and was metered in over the course of 45 minutes. After the end of feed 2, polymerization was continued for 10 minutes, then feed 3 was added and stirred in for 10 minutes. The weight-average molecular weight of the polymer in a sample taken at this point in time was around 7.4 kDa. Subsequently feed 4 was commenced and was metered in 90 minutes. When the first half of feed 4 had been metered in, feed 5 was commenced and metered in parallel to the rest of feed 4 over 45 minutes.

Feed 1 (homogeneous solution of):

| | |
|---|---|
| 55.8 g | of deionized water and |
| 4.2 g | of sodium peroxodisulfate |

Feed 2 (homogeneous mixture of):

| | |
|---|---|
| 283.2 g | of deionized water |
| 20.5 g | of a 15 wt % aqueous solution of sodium lauryl sulfate |
| 47.6 g | of methacrylic acid |
| 38.1 g | of a 25 wt % solution of ureidomethacrylate in methyl methacrylate |
| 318.2 g | of methyl methacrylate |
| 24.5 g | of n-butyl acrylate |
| 47.6 g | of acetoacetoxyethyl methacrylate |
| 22.0 g | of 2-ethylhexyl thioglycolate |

Feed 3:

| 37.6 g | of a 25 wt % ammonia solution |
|---|---|

Feed 4 (homogeneous mixture of):

| 339.2 g | of deionized water |
|---|---|
| 35.5 g | of a 15 wt % aqueous solution of sodium lauryl sulfate |
| 639.8 g | of n-butyl acrylate |
| 260.4 g | of styrene |
| 23.8 g | of acetoacetoxyethyl methacrylate |

Feed 5 (homogeneous solution of):

| 9.3 g | of deionized water and |
|---|---|
| 0.7 g | of sodium peroxodisulfate |

After the end of feeds 4 and 5, the polymerization mixture was left to react further at 80° C. for 30 minutes; then 117 g of deionized water were added and stirring was carried out at 80° C. for 60 minutes more.

Subsequently a further 69 g of deionized water were added and the aqueous polymer dispersion obtained was cooled to room temperature. Lastly, the dispersion was filtered through a 125 μm filter.

The resulting 3146.9 g of the aqueous polymer dispersion had a solids content of 45.0 wt % and a pH of 7.5. The MFFT was ≤0° C. The weight-average molecular weight of the polymer of the dispersion was around 690 kDa. On dilution with deionized water, the aqueous polymer dispersion has a weight-average particle diameter of 42 nm.

INVENTIVE EXAMPLE 6 (IE6)

A polymerization vessel equipped with metering devices and temperature regulation was charged at 20 to 25° C. (room temperature) under a nitrogen atmosphere with

| 722.1 g | of deionized water and |
|---|---|
| 30.8 g | of 15 wt % aqueous solution of sodium lauryl sulfate | and this initial charge was heated to 80° C. with stirring. When this temperature had been reached, the entire feed 1 was added and stirring took place for 2 minutes. Thereafter feed 2 was commenced and was metered in over the course of 45 minutes. After the end of feed 2, polymerization was continued for 10 minutes, then feed 3 was added and stirred in for 10 minutes. Subsequently feed 4 was commenced and was metered in 90 minutes. When the first half of feed 4 had been metered, feed 5 was commenced and was metered in parallel to the remaining feed 4 in 45 minutes.

Feed 1 (homogeneous solution of):

| 55.8 g | of deionized water and |
|---|---|
| 4.2 g | of sodium peroxodisulfate |

Feed 2 (homogeneous mixture of):

| 373.7 g | of deionized water |
|---|---|
| 20.5 g | of a 15 wt % aqueous solution of sodium lauryl sulfate |
| 47.6 g | of methacrylic acid |

-continued

| 359.8 g | of methyl methacrylate |
|---|---|
| 21.0 g | of n-butyl acrylate |
| 47.6 g | of acetoacetoxyethyl methacrylate |
| 21.9 g | of 2-ethylhexyl thioglycolate |

Feed 3:

| 37.6 g | of a 25 wt % ammonia solution |
|---|---|

Feed 4 (homogeneous mixture of):

| 361.9 g | of deionized water |
|---|---|
| 35.5 g | of a 15 wt % aqueous solution of sodium lauryl sulfate |
| 627.2 g | of n-butyl acrylate |
| 249.2 g | of styrene |
| 47.6 g | of acetoacetoxyethyl methacrylate |

Feed 5 (homogeneous solution of):

| 9.3 g | of deionized water and |
|---|---|
| 0.7 g | of sodium peroxodisulfate |

After the end of feeds 4 and 5, the polymerization mixture was left to react further at 80° C. for 30 minutes; then 117 g of deionized water were added and stirring was carried out at 80° C. for 60 minutes more.

Subsequently a further 105 g of deionized water were added and the aqueous polymer dispersion obtained was cooled to room temperature. Lastly, the dispersion was filtered through a 125 μm filter.

The resulting 3295.7 g of the aqueous polymer dispersion had a solids content of 43.6 wt % and a pH of 7.6. The MFFT was ≤0° C. On dilution with deionized water, the aqueous polymer dispersion has a weight-average particle diameter of 37 nm.

INVENTIVE EXAMPLE 6A (IE 6A)

500.0 g of inventive example 6 were introduced and with stirring 39.5 g of a 25 wt % aqueous solution of Jeffamin T403 were added. Stirring was continued for 10 minutes, after which the dispersion was filtered through a 125 μm filter. Solids content of the mixture was 42.0 wt %, pH was 9.5.

COMPARATIVE EXAMPLE 6B (CE 6B)

500.0 g of inventive example 6 were introduced and with stirring 7.8 g of a 50 wt % aqueous solution of hexamethylenediamine were added. Stirring was continued for 10 minutes, after which the dispersion was filtered through a 125 μm filter.

Solids content of the mixture was 43.7 wt %, pH was 9.8.

Measurement Methods

Molecular Weight

In this text, the weight-average molecular weight Mw, unless otherwise indicated, is determined via a size exclusion chromatography (SEC) with tetrahydrofuran+0.1 wt % trifluoroacetic acid as eluent at a flow rate of 1 ml/min and a column temperature of 35° C. The sample is diluted in the eluent to a concentration of 2 mg/ml and 100 μl of this is injected after the sample solution has been filtered through a 0.2 μm filter (Sartorius Minisart SRP 25) in order to remove any possible gel fraction. As the columns, three columns with an internal diameter of 7.5 mm were combined as follows: 5 cm precolumn (Plgel 10μ Guard precolumn), followed by two 30 cm separating columns (each Plgel 10μ Mixed B). Detection took place using a differential refractometer of type Agilent 1100, UV photometer of type Agilent 1100 VWD, PSS SLD7000-BI-MwA (UV/254 nm/Agilent). Calibration was carried out using narrow-range polystyrene standards from Polymer Laboratories with molecular weights of M=580 to M=7,500,000, and also hexylbenzene (M=162). The values outside the elution range were extrapolated.

The filtration which precedes the determination of molecular weight removes any possible gel fraction of the polymer, and so the values reported relate to the sol fraction.

Solids Content

Solids content (SC) was determined generally by drying a defined amount of the aqueous polymer dispersion (around 1 g) to constant weight in a drying cabinet at 140° C., in an aluminum crucible having an internal diameter of around 5 cm. Two separate measurements were conducted. The values reported in the examples represent the average of each of the two results.

Minimum Film-Forming Temperature

The minimum film-forming temperature (MFFT) was determined with Ullmanns Enzyklopädie der technischen Chemie, 4$^{th}$ ed., Vo. 19, Verlag Chemie, Weinheim (1980), p. 17. The measuring apparatus used was a film-forming plate from Coesfeld (a metal plate to which a temperature gradient is applied). Filming took place at a wet film thickness of 1 mm. The minimum film-forming temperature reported is the temperature at which the film begins to develop cracking.

delivered in school grades from 0 to 5 after Y hours. Grade 0=no damage, grade 5=complete failure.

| Inventive examples | X (days) | Y (hours) | Water resistance (school grade) | Comparative examples | Water resistance (school grade) |
|---|---|---|---|---|---|
| IE 1 | 2 | 5 | 3 | CE 1 | 5 |
| IE 1A | 2 | 5 | 0 | CE 1A | 5 |
| IE 1B | 2 | 5 | 1 | CE 1B | 5 |
| IE 1C | 2 | 5 | 2.5 | CE 1C | 5 |
| IE 2A | 1 | 1 | 3 | CE 2A | 5 |
| IE 3 | 1 | 3 | 1 | CE 3 | 4 |
| IE 4 | 1 | 3 | 1 | | |
| IE 5 | 1 | 1 | 1 | | |
| IE 5A | 1 | 1 | 0 | | |
| IE 6A | 3 | 1 | 0 | CE 6B | 4.5 |

Inventive example 1 shows the effect on the water resistance of the coating when the crosslinking monomer is used in both stages; the series A-C shows the effect of the propoxylated triamine added in differing amount.

Inventive example 2 shows the effect on the water resistance of the coating when a monomer M bearing epoxide groups is used in the 2$^{nd}$ stage.

Inventive examples 3, 4, and 5 show the effect on the water resistance of the coating when tert-butyl acrylate is used in stage 1; furthermore, inventive example 5A shows the additional improvement from adding the propoxylated triamine.

Inventive example 6A and comparative example 6B show the comparison between use of a propoxylated triamine and of an aliphatic diamine.

TABLE 1

Formulation of an opaque coating

| Component | Definition | Manufacturer | Concentration (wt %) | Weight fraction (ppt) |
|---|---|---|---|---|
| DI - water 01 | | | | 80 |
| EnviroGem AD01 | Wetting agent | Air Products | | 1 |
| FoamStar ST 2454 | Defoamer | BASF SE | | 2 |
| Dispex CX 4231 | Pigment dispersant | BASF SE | 30 | 7.5 |
| Ammonia, concentrated | Neutralizing agent | | 25 | 2 |
| Tiona 595 | TiO$_2$ pigment | Cristal | | 230 |
| Rheovis PU 1340 | Polyurethane thickener | BASF SE | 30 | 17 |
| Emulsion polymer | | | 45 | 600 |
| FoamStar SI 2210 | Defoamer | BASF SE | | 2 |
| DI - water 02 | | | | 58.5 |
| Total | | | | 1000 |

Particle Size

The particle size of the polymer of the invention was determined by means of hydrodynamic chromatography (HDC).

Glass Transition Temperature

Unless otherwise indicated, the glass transition temperature Tg was determined by means of the Fox equation.

Water Resistance of the Coating

A formulation of the respective polymer dispersion, as defined in table 1, is drawn down onto glass with a wet thickness of 300 μm. It is subsequently dried for X days at RT (standard conditions). Then DI water is placed on the coating and a waiting time is observed. The assessment was

We claim:

1. A polymer dispersion, obtained by at least one two-stage emulsion polymerization process comprising:
    1) preparing an acid-rich first polymer P1 by a first stage radical emulsion polymerization from a 1$^{st}$ composition comprising:
        A) at least one monomer selected from the group consisting of a (cyclo)alkyl (meth)acrylate, a vinylaromatic having up to 20 carbon atoms, a radically polymerizable compound selected from the group consisting of an ethylenically unsaturated nitrile having up to 20 carbon atoms, a vinyl ester of a carboxylic acid containing up to 20 carbon atoms, a vinyl halide having up to 10 carbon atoms, and a vinyl ether of an alcohol containing 1 to 10 carbon atoms,
B) at least one α,β-ethylenically unsaturated carboxylic acid,
C) at least one crosslinking monomer with a keto or aldehyde group,
D) optionally at least one adhesion promoter,
E) optionally tert-butyl acrylate, and
F) optionally a further monomer M
in the presence of a chain link transfer agent;
2) mixing the polymer P1 with a base;
3) preparing a hydrophobic polymer P2 by a second stage radical emulsion polymerization, in the presence of the polymer P1 obtained from 2), from a $2^{nd}$ composition comprising
A) at least one monomer selected from the group consisting of a (cyclo)alkyl (meth)acrylate, a vinylaromatic having up to 20 carbon atoms, a radically polymerizable compound selected from the group consisting of an ethylenically unsaturated nitrile having up to 20 carbon atoms, a vinyl ester of a carboxylic acid containing up to 20 carbon atoms, a vinyl halide having up to 10 carbon atoms, and a vinyl ether of an alcohol containing 1 to 10 carbon atoms,
B) optionally at least one α,β-ethylenically unsaturated carboxylic acid,
C) at least one crosslinking monomer with a keto or aldehyde group,
D) optionally at least one adhesion promoter, and
E) optionally a further monomer M; and
4) subsequent to the polymerization of P1 and P2, adding a water-soluble at least trifunctional polyamine.

2. The polymer dispersion according to claim 1, wherein the water-soluble trifunctional polyamine is an ethoxy/propoxylated triamine, and a molar ratio of the ethoxy/propoxylated triamine to the keto- and/or aldehyde-functional monomer C), is 1:1 to 1:9.

3. The polymer dispersion according to claim 1, wherein a weight-average molecular weight of the polymerized monomers of the first stage polymerization is between 2 and 35 kDa, and a weight-average molecular weight of polymerized monomers of the second stage polymerization is greater than 50 kDa.

4. The polymer dispersion according to claim 1, wherein a weight ratio of the acid-rich polymer P1 to the hydrophobic polymer P2 ranges from 20/80 to 50/50.

5. The polymer dispersion according to claim 1, wherein the monomers of the first stage polymerization are selected such that the P1 has a glass transition temperature of greater than 50° C.

6. The polymer dispersion according to claim 1, wherein the monomers of the second stage polymerization are selected such that the polymer P2 has a glass transition temperature of at least 50° C. lower than that of the polymer P1.

7. The polymer dispersion according to claim 1, wherein the 1st composition comprises
A) 33-93 wt % of at least one (cyclo)alkyl (meth)acrylate having a homopolymer Tg of greater than 50° C., and 0 to 60 wt % of a (cyclo)alkyl (meth)acrylate having a homopolymer Tg of less than 0° C.,
B) 5-15 wt % of at least one α,β-ethylenically unsaturated carboxylic acid,
C) 2-15 wt % of at least one crosslinking monomer with a keto or aldehyde group,
D) 0-4 wt % of at least one adhesion promoter,
E) 0-25 wt % of tert-butyl acrylate, and
F) 0-10 wt % of monomer M,
relative to 100 wt % of the monomers to be polymerized in the $1^{st}$ composition.

8. The polymer dispersion according to claim 1, wherein the $2^{nd}$ composition comprises
A) 0-55 wt % of at least one (cyclo)alkyl (meth)acrylate and/or vinylaromatic monomer having a homopolymer Tg of greater than 50° C., and 44 to 99 wt % of a (cyclo)alkyl (meth)acrylate having a homopolymer Tg of less than 0° C.,
B) 0-2 wt % of at least one α,β-ethylenically unsaturated carboxylic acid,
C) 1-10 wt % of at least one crosslinking monomer with a keto or aldehyde group,
D) 0-2 wt % of at least one adhesion promoter,
E) 0-10 wt % of monomer M,
relative to 100 wt % of the monomers to be polymerized in the $2^{nd}$ composition.

9. The polymer dispersion according to claim 1, wherein tert-butyl acrylate is contained as a further monomer E) in the first stage polymerization in an amount of 1.5-2.5 wt %, based on a total weight of the $1^{st}$ stage monomers used for the polymerization.

10. The polymer dispersion according to claim 1, wherein a particle size of the polymer P1 and/or of the polymer P2 is in a range of from 1 nm to 100 nm.

11. A method for producing the polymer dispersion according to claim 1,
the method comprising:
1) preparing an acid-rich first polymer P1 from the $1^{st}$ composition;
2) admixing the polymer P1 with a base;
3) preparing a hydrophobic polymer P2 from the $2^{nd}$ composition in the presence of the polymer P1 obtained from 2); and
4) subsequent to the polymerization of P1 and P2, optionally adding a water-soluble at least trifunctional alkoxylated polyamine.

12. A coating material in the form of an aqueous composition, the coating material comprising
i) at least one polymer dispersion according to claim 1,
ii) optionally at least one (in)organic filler and/or an (in)organic pigment,
iii) optionally an additive, and
iv) water.

13. A coating composition, comprising the polymer dispersion according to claim 1.

14. A paint or a varnish, comprising the polymer dispersion according to claim 1.

15. The polymer dispersion according to claim 1, wherein a content of the α,β-ethylenically unsaturated carboxylic acid in the first, acid-rich stage is from 5 to 15 wt % and a content of the α,β-ethylenically unsaturated carboxylic acids in the second stage is from 0 to 2 wt %, based on the total monomers of the respective stages.

16. A polymer dispersion, obtained by at least one two-stage emulsion polymerization process comprising:
1) preparing an acid-rich first polymer P1 by a first stage radical emulsion polymerization from a $1^{st}$ composition comprising:
A) at least one monomer selected from the group consisting of a (cyclo)alkyl (meth)acrylate, a vinylaromatic having up to 20 carbon atoms, a radically polymerizable compound selected from the group consisting of an ethylenically unsaturated nitrile having up to 20 carbon atoms, a vinyl ester of a carboxylic acid containing up to 20 carbon atoms, a vinyl halide having up to 10 carbon atoms, and a vinyl ether of an alcohol containing 1 to 10 carbon atoms,
B) at least one α,β-ethylenically unsaturated carboxylic acid,
C) at least one crosslinking monomer with a keto or aldehyde group,
D) optionally at least one adhesion promoter,
E) optionally tert-butyl acrylate, and
F) optionally a further monomer M in the presence of a chain link transfer agent;
2) mixing the polymer P1 with a base;
2) preparing a hydrophobic polymer P2 by a second stage radical emulsion polymerization, in the presence of the polymer P1 obtained from 2), from a $2^{nd}$ composition comprising
A) at least one monomer selected from the group consisting of a (cyclo)alkyl (meth)acrylate, a vinylaromatic having up to 20 carbon atoms, a radically polymerizable compound selected from the group consisting of an ethylenically unsaturated nitrile having up to 20 carbon atoms, a vinyl ester of a carboxylic acid containing up to 20 carbon atoms, a vinyl halide having up to 10 carbon atoms, and a vinyl ether of an alcohol containing 1 to 10 carbon atoms,
B) optionally at least one α,β-ethylenically unsaturated carboxylic acid,
C) at least one crosslinking monomer with a keto or aldehyde group,
D) optionally at least one adhesion promoter, and
E) optionally a further monomer M; and
4) subsequent to the polymerization of P1 and P2, optionally adding a water-soluble at least trifunctional polyamine and wherein a weight-average molecular weight of the polymerized monomers of the first stage polymerization is between 2 and 35 kDa, and a weight-average molecular weight of polymerized monomers of the second stage polymerization is greater than 50 kDa.

* * * * *